United States Patent
Kawamura et al.

(10) Patent No.: US 8,224,762 B2
(45) Date of Patent: Jul. 17, 2012

(54) INFORMATION PROCESSING METHOD AND APPARATUS FOR BUSINESS PROCESS ANALYSIS

(75) Inventors: Akira Kawamura, Kawasaki (JP);
Yoshihide Nomura, Kawasaki (JP);
Kenichi Kobayashi, Kawasaki (JP);
Tsuyoshi Kanai, Kawasaki (JP);
Hirotaka Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 690 days.

(21) Appl. No.: 12/403,773

(22) Filed: Mar. 13, 2009

(65) Prior Publication Data
US 2009/0177610 A1 Jul. 9, 2009

Related U.S. Application Data

(63) Continuation of application No. PCT/JP2006/318334, filed on Sep. 15, 2006.

(51) Int. Cl.
*G06F 17/00* (2006.01)
*G06N 5/02* (2006.01)
(52) U.S. Cl. .................. 706/47; 706/46; 706/61
(58) Field of Classification Search .......... None
See application file for complete search history.

(56) References Cited

U.S. PATENT DOCUMENTS

| | | | |
|---|---|---|---|
| 4,965,763 A | 10/1990 | Zamora | |
| 5,809,500 A * | 9/1998 | Nolan | 1/1 |
| 5,897,633 A * | 4/1999 | Nolan | 1/1 |
| 6,195,622 B1 * | 2/2001 | Altschuler et al. | 703/2 |
| 6,457,014 B1 | 9/2002 | Parker | |
| 2003/0150908 A1 * | 8/2003 | Pokorny et al. | 235/375 |
| 2004/0254919 A1 * | 12/2004 | Giuseppini | 707/3 |
| 2005/0076059 A1 | 4/2005 | Nomura et al. | |
| 2006/0191993 A1 * | 8/2006 | Markham et al. | 235/376 |
| 2008/0021867 A1 | 1/2008 | Nomura et al. | |

FOREIGN PATENT DOCUMENTS

| | | |
|---|---|---|
| JP | 2005-165826 | 6/2005 |
| JP | 2005-173847 | 6/2005 |
| JP | 2006/134106 | 5/2006 |
| WO | 2007/132547 A1 | 11/2007 |

OTHER PUBLICATIONS

International Search Report for PCT/JP2006/318334, mailed Oct. 31, 2006.
Japanese Office Action issued May 31, 2011 in corresponding Japanese Patent Application 2008-534195.

* cited by examiner

*Primary Examiner* — Jeffrey A Gaffin
*Assistant Examiner* — Adrian Kennedy
(74) *Attorney, Agent, or Firm* — Fujitsu Patent Center

(57) ABSTRACT

An information processing method for a business process analysis includes identifying a processing target field in a record generated in an analysis target system and stored in a data storage; identifying data representing probability that the processing target field corresponds to a time stamp of an event by using definition data for each field in the record; and presenting a user with the identified data so as to correspond to each said field.

22 Claims, 31 Drawing Sheets

EVENT CANDIDATE DATA
| EVENT NAME | TIME | VALUE1 | ... |
|---|---|---|---|
| | | | |
| | | | |
| ⋮ | | | |
| | | | |
FIG.2A
EVENT DATA
| EVENT NAME | TIME | ID1 | ... |
|---|---|---|---|
| | | | |
| | | | |
| ⋮ | | | |
| | | | |
EVENT ID
ASSOCIATED ID
| EVENT NAME | TIME | ID1 | ID2 |
|---|---|---|---|
| | | | |
| | | | |
| ⋮ | | | |
| | | | |
FIG.2B
PROCESS INSTANCE
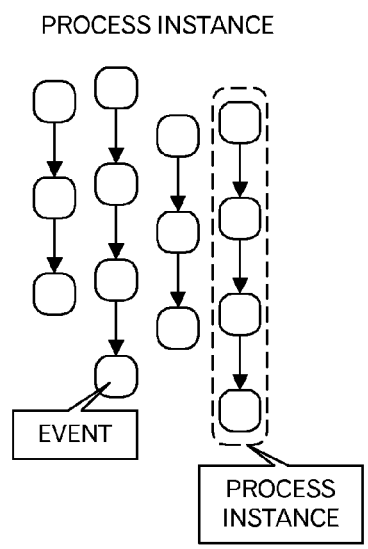
EVENT
PROCESS INSTANCE
FIG.2C
PROCESS FLOW
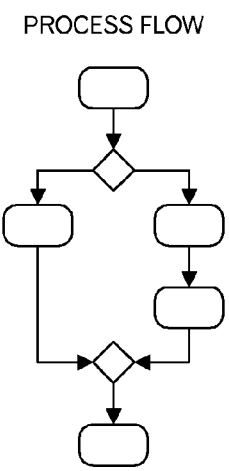
FIG.2D

FIG.4A

| FIELD NAME | FIELD 1 | FIELD 2 | FIELD 3 | FIELD 4 |
|---|---|---|---|---|
|  | TIME | ORDER NO. | AREA | ORDER CONTENTS |
| KEY SETTING | — | PRIMARY KEY | — | — |
| DATA TYPE | TIME STAMP | FIXED-LENGTH CHARACTER STRING | FIXED-LENGTH CHARACTER STRING | VARIABLE-LENGTH CHARACTER STRING |
| RECORD LENGTH | 20 | 4 | 5 | INITIAL VALUE=10 INCREMENT=5 |
| COMMENTS | INPUT TIME OF ORDER | ORDER CODE + SERIAL NO. | PREFECTURE NAME | FREE DESCRIPTION |

FIG.4B

| FIELD 1 | FIELD 2 | FIELD 3 | FIELD 4 |
|---|---|---|---|
| 2006/06/01 10:34:52.241 | JT01 | TOKYO | NOTE BOOK PC×1+PC×2 |
| 2006/06/02 15:43:24.137 | JT02 | TOKYO | PORTABLE PC |
| 2006/06/05 20:27:46.793 | JT03 | KANAGAWA | SERVER MACHINE |
| 2006/06/06 10:41:33.633 | JT04 | KANAGAWA | PC |

FIG.5A

|  | FIELD 1 | FIELD 2 | FIELD 3 | FIELD 4 | FIELD 5 |
|---|---|---|---|---|---|
| FIELD NAME | TIME | PRODUCTION NO. | ORDER NO. | PRODUCT NO. | DUE DATE |
| KEY SETTING | — | PRIMARY KEY | AUXILIARY KEY | AUXILIARY KEY | — |
| DATA TYPE | TIME STAMP | FIXED-LENGTH CHARACTER STRING | FIXED-LENGTH CHARACTER STRING | FIXED-LENGTH CHARACTER STRING | DATE |
| RECORD LENGTH | 20 | 4 | 4 | 4 | 10 |
| COMMENTS | RECEIPT TIME OF PRODUCTION INSTRUCTION | PRODUCTION CODE + SERIAL NO. | REFER TO ORDER PB | REFER TO PRODUCT NO. DB | DETERMINED AT INSTRUCTION RECEIPT TIME |

FIG.5B

| FIELD 1 | FIELD 2 | FIELD 3 | FIELD 4 | FIELD 5 |
|---|---|---|---|---|
| 2006/06/02 09:54:48.436 | SS01 | JT01 | PR01 | 2006/06/06 |
| 2006/06/19 14:37:52.448 | SS02 | JT01 | PR02 | 2006/06/13 |
| 2006/06/06 15:36:12.847 | SS04 | JT03 | PR03 | 2006/06/11 |
| 2006/06/06 08:52:37.624 | SS05 | JT03 | PR03 | 2006/06/11 |

FIG.6A

| | FIELD 1 | FIELD 2 | FIELD 3 | FIELD 4 | FIELD 5 |
|---|---|---|---|---|---|
| FIELD NAME | TIME | ARRANGEMENT NO. | ORDER NO. | PRODUCT NO. | DELIVERY DESTINATION |
| KEY SETTING | — | PRIMARY KEY | AUXILIARY KEY | AUXILIARY KEY | — |
| DATA TYPE | TIME STAMP | FIXED-LENGTH CHARACTER STRING | FIXED-LENGTH CHARACTER STRING | FIXED-LENGTH CHARACTER STRING | FIXED-LENGTH CHARACTER STRING |
| RECODE LENGTH | 20 | 4 | 4 | 4 | 5 |
| COMMENTS | ARRANGEMENT TIME | ARRANGEMENT CODE + SERIAL NO. | REFER TO ORDER DB | REFER TO PRODUCT NO.DB | PREFECTURE NAME |

FIG.6B

| FIELD 1 | FIELD 2 | FIELD 3 | FIELD 4 | FIELD 5 |
|---|---|---|---|---|
| 2006/06/10 20:52:33.727 | TH01 | JT01 | PR01 | TOKYO |
| 2006/06/10 12:26:36.006 | TH02 | JT01 | PR02 | TOKYO |
| 2006/06/12 09:52:23.976 | TH03 | JT01 | PR02 | TOKYO |
| 2006/06/12 11:26:52.082 | TH04 | JT02 | PR01 | TOKYO |
| 2006/06/14 08:11:13.725 | TH05 | JT03 | PR03 | KANAGAWA |
| 2006/06/15 22:56:42.225 | TH06 | JT04 | PR02 | KANAGAWA |

FIG.7A

| | FIELD 1 | FIELD 2 | FIELD 3 | FIELD 4 |
|---|---|---|---|---|
| FIELD NAME | TIME | ARRANGEMENT NO. | DELIVERY SERVICE | DELIVERY DESTINATION |
| KEY SETTING | — | PRIMARY KEY | AUXILIARY KEY | — |
| DATA TYPE | TIME STAMP | FIXED-LENGTH CHARACTER STRING | FIXED-LENGTH CHARACTER STRING | FIXED-LENGTH CHARACTER STRING |
| RECODE LENGTH | 20 | 4 | 4 | 5 |
| COMMENTS | DELIVERY TIME | ARRANGEMENT CODE + SERIAL NO. | — | PREFECTURE NAME |

FIG.7B

| FIELD 1 | FIELD 2 | FIELD 3 | FIELD 4 |
|---|---|---|---|
| 2006/06/19 14:26:13.634 | TH01 | HS01 | TOKYO |
| 2006/06/19 21:53:53.405 | TH02 | HS01 | TOKYO |
| 2006/06/19 14:42:55.963 | TH03 | HS01 | TOKYO |
| 2006/06/19 20:25:42.062 | TH04 | HS01 | TOKYO |
| 2006/06/21 16:31:56.465 | TH05 | HS02 | KANAGAWA |
| 2006/06/22 09:47:35.975 | TH06 | HS03 | KANAGAWA |

|  | FIELD 1 | FIELD 2 |
|---|---|---|
| FIELD NAME | PRODUCT NO. | PRODUCT NAME |
| KEY SETTING | PRIMARY KEY | — |
| DATA TYPE | FIXED-LENGTH CHARACTER STRING | FIXED-LENGTH CHARACTER STRING |
| RECODE LENGTH | 4 | 10 |
| COMMENTS | PRODUCT NO. CODE+SERIAL NO. | KATAKANA EXPRESSION |

FIG.8A

| FIELD 1 | FIELD 2 |
|---|---|
| PR01 | NOTE BOOK PC |
| PR02 | PC |
| PR03 | SERVER |

FIG.8B

TIME, ORDER NO., AREA, ORDER CONTENTS,
2006/06/01 10:34:52.241,JT01,TOKYO,NOTE BOOK PC×1+PC×2,
2006/06/02 15:43:24.137,JT02,TOKYO,PORTABLE PC,
2006/06/05 20:27:46.793,JT03,KANAGAWA,SERVER MACHINE,
2006/06/06 10:41:33.633,JT04,KANAGAWA,PC,

FIG.9A

| TIME | ORDER NO. | AREA | ORDER CONTENTS |
|---|---|---|---|
| 2006/06/01 10:34:52.241 | JT01 | TOKYO | NOTE BOOK PC×1+PC×2 |
| 2006/06/02 15:43:24.137 | JT02 | TOKYO | PORTABLE PC |
| 2006/06/05 20:27:46.793 | JT03 | KANAGAWA | SERVER MACHINE |
| 2006/06/06 10:41:33.633 | JT04 | KANAGAWA | PC |

FIG.9B

TIME, PRODUCTION NO., ORDER NO., PRODUCT NO., DUE DAT
2006/06/02 09:54:48.436,SS01,JT01,PR01,2006/06/06,
2006/06/19 14:37:52.448,SS02,JT01,PR02,2006/06/13,
2006/06/06 15:36:12.847,SS04,JT03,PR03,2006/06/11,
2006/06/08 13:38:51.446,SS06,JT04,PR02,2006/06/15,

FIG.10A

| TIME | PRODUCTION NO. | ORDER NO. | PRODUCT NO. | DUE DATE |
|---|---|---|---|---|
| 2006/06/02 09:54:48.436 | SS01 | JT01 | PR01 | 2006/06/06 |
| 2006/06/19 14:37:52.448 | SS02 | JT01 | PR02 | 2006/06/13 |
| 2006/06/06 15:36:12.847 | SS04 | JT03 | PR03 | 2006/06/11 |
| 2006/06/06 08:52:37.624 | SS05 | JT03 | PR03 | 2006/06/11 |

FIG.10B

TIME, ARRANGEMENT NO., ORDER NO., PRODUCT NO., DELIVERY DESTINATION,
2006/06/10 20:52:33.727,TH01,JT01,PR01,TOKYO,
2006/06/10 12:26:36.006,TH02,JT01,PR02,TOKYO,
2006/06/12 09:52:23.976,TH03,JT01,PR02,TOKYO,
2006/06/12 11:26:52.082,TH04,JT02,PR01,TOKYO,
2006/06/14 08:11:13.725,TH05,JT03,PR03,KANAGAWA,
2006/06/15 22:56:42.225,TH06,JT04,PR02,KANAGAWA,

FIG.11A

| TIME | ARRANGEMENT NO. | ORDER NO. | PRODUCT NO. | DELIVERY DESTINATION |
|---|---|---|---|---|
| 2006/06/10 20:52:33.727 | TH01 | JT01 | PR01 | TOKYO |
| 2006/06/10 12:26:36.006 | TH02 | JT01 | PR02 | TOKYO |
| 2006/06/12 09:52:23.976 | TH03 | JT01 | PR02 | TOKYO |
| 2006/06/12 11:26:52.082 | TH04 | JT02 | PR01 | TOKYO |
| 2006/06/14 08:11:13.725 | TH05 | JT03 | PR03 | KANAGAWA |
| 2006/06/15 22:56:42.225 | TH06 | JT04 | PR02 | KANAGAWA |

FIG.11B

TIME, ARRANGEMENT NO., DELIVERY SERVICE, DELIVERY DESTINATION,
2006/06/19 14:26:13.634,TH01,HS01,TOKYO,
2006/06/19 21:53:53.405,TH02,HS01,TOKYO,
2006/06/19 14:42:55.963,TH03,HS01,TOKYO,
2006/06/19 20:25:42.062,TH04,HS01,TOKYO,
2006/06/21 16:31:56.465,TH05,HS02,KANAGAWA,
2006/06/22 09:47:35.975,TH06,HS03,KANAGAWA,

FIG.12A

| TIME | ARRANGEMENT NO. | DELIVERY SERVICE | DELIVERY DESTINATION |
|---|---|---|---|
| 2006/06/19 14:26:13.634 | TH01 | HS01 | TOKYO |
| 2006/06/19 21:53:53.405 | TH02 | HS01 | TOKYO |
| 2006/06/19 14:42:55.963 | TH03 | HS01 | TOKYO |
| 2006/06/19 20:25:42.062 | TH04 | HS01 | TOKYO |
| 2006/06/21 16:31:56.465 | TH05 | HS02 | KANAGAWA |
| 2006/06/22 09:47:35.975 | TH06 | HS03 | KANAGAWA |

FIG.12B

PRODUCT NO., PRODUCT NAME,
PR01, NOTE BOOK PC,
PR02, PC,
PR03, SERVER,

FIG.13A

| PRODUCT NO. | PRODUCT NAME |
|---|---|
| PR01 | NOTE BOOK PC |
| PR02 | PC |
| PR03 | SERVER |

FIG.13B

| JUDGMENT ITEMS | CONFIDENCE SCORE (%) |
|---|---|
| DATA TYPE OF FIELD IS VARIABLE LENGTH CHARACTER STRING | 1 |
| DATA TYPE OF FIELD IS REAL | 5 |
| END OF FIELD NAME IS "TIME" OR "HOUR" | 90 |
| END OF FIELD NAME IS "DATE" OR "DAY" | 70 |
| FIELD NAME INCLUDES "PLAN", "DUE DATE", "DELIVERY" OR "ESTIMATE" | 10 |
| CHARACTER STRING OF FIELD VALUE INCLUDES CHARACTERS OTHER THAN NAME OF ERA (SYMBOL), "/",":"," ",".", "-", NUMERALS AND SPACE | 5 |
| CHARACTER STRING OF FIELD VALUE IS IN FORMAT "YYYY/MM/DD hh:mm:ss" | 90 |
| CHARACTER STRING OF FIELD VALUE IS IN FORMAT "YYYY/MM/DD" OR "YY/MM/DD" | 70 |
| FIELD VALUES INCLUDE SAME VALUES | 30 |

FIG.15

| JUDGMENT ITEMS | CONFIDENCE SCORE (%) |
|---|---|
| DATA TYPE OF FIELD IS VARIABLE LENGTH CHARACTER STRING | 1 |
| DATA TYPE OF FIELD IS REAL | 5 |
| DATA TYPE OF FIELD IS INTEGER | 80 |
| DATA TYPE OF FIELD IS FIXED LENGTH CHARACTER STRING | 70 |
| DATA TYPE OF FIELD IS TIME STAMP OR DATE | 10 |
| PRIMARY KEY IS DESIGNATED TO THIS FIELD | 80 |

FIG.17

| TABLE NAME: ORDER | TIME (FIELD 1) | ORDER NO. (FIELD 2) | AREA (FIELD 3) | ORDER CONTENTS (FIELD 4) |
|---|---|---|---|---|
| EVENT NAME JUDGMENT EVENT NAME = TABLE NAME | DENIAL | DENIAL | DENIAL | DENIAL |
| TIME STAMP JUDGMENT | DETERMINED | 5% | 5% | 1% |
| EVENT ID AND ASSOCIATED ID CANDIDATE JUDGMENT | 10% | 80% | 70% | 1% |

TABLE NAME "PURCHASE REQUEST"

| SLIP NO. | SLIP ISSUER | ... | SLIP ISSUANCE TIME | APPROVAL TIME | ORDER TIME | DELIVERY TIME | INSPECTION TIME |
|---|---|---|---|---|---|---|---|
| 3127 | A | ... | 05/04/10 | 05/04/12 | 05/04/14 | 05/04/20 | 05/04/21 |
| 3128 | B | ... | 05/04/16 | 05/04/17 | — | — | — |

FIG.19

| EVENT NAME "PURCHASE REQUEST : SLIP ISSUANCE" | | | |
|---|---|---|---|
| SLIP NO. | SLIP ISSUER | ... | SLIP ISSUANCE TIME |
| 3127 | A | ... | 05/04/10 |
| 3128 | B | ... | 05/04/16 |

FIG.20A

| EVENT NAME "PURCHASE REQUEST : APPROVAL" | | | |
|---|---|---|---|
| SLIP NO. | SLIP ISSUER | ... | APPROVAL TIME |
| 3127 | A | ... | 05/04/12 |
| 3128 | B | ... | 05/04/17 |

FIG.20B

| EVENT NAME "PURCHASE REQUEST : ORDER" | | | |
|---|---|---|---|
| SLIP NO. | SLIP ISSUER | ... | ORDER TIME |
| 3127 | A | ... | 05/04/14 |

FIG.20C

| EVENT NAME "PURCHASE REQUEST : DELIVERY" | | | |
|---|---|---|---|
| SLIP NO. | SLIP ISSUER | ... | DELIVERY TIME |
| 3127 | A | ... | 05/04/20 |

FIG.20D

| EVENT NAME "PURCHASE REQUEST : INSPECTION" | | | |
|---|---|---|---|
| SLIP NO. | SLIP ISSUER | ... | INSPECTION TIME |
| 3127 | A | ... | 05/04/21 |

FIG.20E

| TABLE NAME : ORDER | TIME (FIELD 1) | ORDER NO. (FIELD 2) | AREA (FIELD 3) | ORDER CONTENTS (FIELD 4) |
|---|---|---|---|---|
| EVENT NAME JUDGMENT EVENT NAME =TABLE NAME | DENIAL | DENIAL | DENIAL | DENIAL |
| TIME STAMP JUDGMENT | 90% | 5% | 5% | 5% |
| EVENT ID AND ASSOCIATED ID CANDIDATE JUDGMENT | 50% | 50% | 50% | 50% |

FIG.22

| TABLE NAME : DELIVERY | TIME (FIELD 1) | ARRANGEMENT NO. (FIELD 2) | DELIVERY SERVICE (FIELD 3) | DELIVERY DESTINATION (FIELD 4) |
|---|---|---|---|---|
| EVENT NAME JUDGMENT EVENT NAME =TABLE NAME | DENIAL | DENIAL | DENIAL | DENIAL |
| TIME STAMP JUDGMENT | DETERMINED | 5% | 5% | 5% |
| EVENT ID AND ASSOCIATED ID CANDIDATE JUDGMENT | 10% | 80% | 70% | 70% |

FIG.27

| TABLE NAME : DELIVERY | TIME (FIELD 1) | ARRANGEMENT NO. (FIELD 2) | DELIVERY SERVICE (FIELD 3) | DELIVERY DESTINATION (FIELD 4) |
|---|---|---|---|---|
| EVENT NAME JUDGMENT EVENT NAME =TABLE NAME | DENIAL | DENIAL | DENIAL | DENIAL |
| TIME STAMP JUDGMENT | 90% | 5% | 5% | 5% |
| EVENT ID AND ASSOCIATED ID CANDIDATE JUDGMENT | 50% | 50% | 50% | 50% |

| TABLE NAME : PRODUCTION | TIME (FIELD 1) | PRODUCTION NO. (FIELD 2) | ORDER NO. (FIELD 3) | PRODUCT NO. (FIELD 4) | DUE DATE (FIELD 5) |
|---|---|---|---|---|---|
| EVENT NAME JUDGMENT EVENT NAME = TABLE NAME | DENIAL | DENIAL | DENIAL | DENIAL | DENIAL |
| TIME STAMP JUDGMENT | DETERMINED | 5% | 5% | 5% | 10% |
| EVENT ID AND ASSOCIATED ID CANDIDATE JUDGMENT | 10% | 80% | 70% | 70% | 10% |

FIG.24

| TABLE NAME : PRODUCTION | TIME (FIELD 1) | PRODUCTION NO. (FIELD 2) | ORDER NO. (FIELD 3) | PRODUCT NO. (FIELD 4) | DUE DATE (FIELD 5) |
|---|---|---|---|---|---|
| EVENT NAME JUDGMENT EVENT NAME = TABLE NAME | DENIAL | DENIAL | DENIAL | DENIAL | DENIAL |
| TIME STAMP JUDGMENT | 90% | 5% | 5% | 5% | 10% |
| EVENT ID AND ASSOCIATED ID CANDIDATE JUDGMENT | 50% | 50% | 50% | 50% | 50% |

| TABLE NAME: ARRANGEMENT | TIME (FIELD 1) | ARRANGEMENT NO. (FIELD 2) | ORDER NO. (FIELD 3) | PRODUCT NO. (FIELD 4) | DELIVERY DESTINATION (FIELD 5) |
|---|---|---|---|---|---|
| EVENT NAME JUDGMENT EVENT NAME = TABLE NAME | DENIAL | DENIAL | DENIAL | DENIAL | DENIAL |
| TIME STAMP JUDGMENT | DETERMINED | 5% | 5% | 5% | 5% |
| EVENT ID AND ASSOCIATED ID CANDIDATE JUDGMENT | 10% | 80% | 70% | 70% | 70% |

FIG.25

| TABLE NAME : ARRANGEMENT | TIME (FIELD 1) | ARRANGEMENT NO. (FIELD 2) | ORDER NO. (FIELD 3) | PRODUCT NO. (FIELD 4) | DELIVERY DESTINATION (FIELD 5) |
|---|---|---|---|---|---|
| EVENT NAME JUDGMENT EVENT NAME = TABLE NAME | DENIAL | DENIAL | DENIAL | DENIAL | DENIAL |
| TIME STAMP JUDGMENT | 90% | 5% | 5% | 5% | 5% |
| EVENT ID AND ASSOCIATED ID CANDIDATE JUDGMENT | 50% | 50% | 50% | 50% | 50% |

FIG.26

| TABLE NAME : PRODUCT NO. | PRODUCT NO. (FIELD 1) | PRODUCT NAME (FIELD 2) |
|---|---|---|
| EVENT NAME JUDGMENT | DENIAL | DENIAL |
| TIME STAMP JUDGMENT | 5% | 5% |
| EVENT ID AND ASSOCIATED ID CANDIDATE JUDGMENT | 80% | 70% |

FIG.29

| TABLE NAME : PRODUCT NO. | PRODUCT NO. (FIELD 1) | PRODUCT NAME (FIELD 2) |
|---|---|---|
| EVENT NAME JUDGMENT | DENIAL | DENIAL |
| TIME STAMP JUDGMENT | 5% | 5% |
| EVENT ID AND ASSOCIATED ID CANDIDATE JUDGMENT | 50% | 50% |

FIG.30

| EVENT NAME | ORDER (TABLE NAME) |
|---|---|
| TIME STAMP | TIME (FIELD 1) |
| EVENT ID AND ASSOCIATED ID CANDIDATE | ORDER NO. (FIELD 2), AREA (FIELD 3) |

FIG.31

| EVENT NAME | TIME STAMP | EVENT ID AND ASSOCIATED ID CANDIDATE | |
|---|---|---|---|
| | | ORDER NO. | AREA |
| ORDER | 2006/06/01 10:34:52.241 | JT01 | TOKYO |
| ORDER | 2006/06/02 15:43:24.137 | JT02 | TOKYO |
| ORDER | 2006/06/05 20:27:46.793 | JT03 | KANAGAWA |
| ORDER | 2006/06/06 10:41:33.633 | JT04 | KANAGAWA |

FIG.32

| EVENT NAME | TIME STAMP | EVENT ID AND ASSOCIATED ID CANDIDATE | | |
|---|---|---|---|---|
| | | ORDER NO. | AREA | ORDER CONTENTS |
| ORDER | 2006/06/01 10:34:52.241 | JT01 | TOKYO | NOTE BOOK PC×1+PC×2 |
| ORDER | 2006/06/02 15:43:24.137 | JT02 | TOKYO | PORTABLE PC |
| ORDER | 2006/06/05 20:27:46.793 | JT03 | KANAGAWA | SERVER MACHINE |
| ORDER | 2006/06/06 10:41:33.633 | JT04 | KANAGAWA | PC |

FIG.33

| EVENT NAME | TIME STAMP | EVENT ID AND ASSOCIATED ID CANDIDATE | | |
|---|---|---|---|---|
| | | PRODUCTION NO. | ORDER NO. | PRODUCT NO. |
| PRODUCTION | 2006/06/02 09:54:48.436 | SS01 | JT01 | PR01 |
| PRODUCTION | 2006/06/19 14:37:52.448 | SS02 | JT01 | PR02 |
| PRODUCTION | 2006/06/06 15:36:12.847 | SS04 | JT03 | PR03 |
| PRODUCTION | 2006/06/06 08:52:37.624 | SS05 | JT03 | PR03 |

FIG.34

| EVENT NAME | TIME STAMP | EVENT ID AND ASSOCIATED ID CANDIDATE | | | |
|---|---|---|---|---|---|
| | | PRODUCTION NO. | ORDER NO. | PRODUCT NO. | DUE DATE |
| PRODUCTION | 2006/06/02 09:54:48.436 | SS01 | JT01 | PR01 | 2006/06/06 |
| PRODUCTION | 2006/06/19 14:37:52.448 | SS02 | JT01 | PR02 | 2006/06/13 |
| PRODUCTION | 2006/06/06 15:36:12.847 | SS04 | JT03 | PR03 | 2006/06/11 |
| PRODUCTION | 2006/06/08 13:38:51.446 | SS06 | JT04 | PR02 | 2006/06/15 |

FIG.35

| EVENT NAME | TIME STAMP | EVENT ID AND ASSOCIATED ID CANDIDATE | | | |
|---|---|---|---|---|---|
| | | ARRENGEMENT NO. | ORDER NO. | PRODUCT NO. | DELIVERY DESTINATION |
| ARRANGEMENT | 2006/06/10 20:52:33.727 | TH01 | JT01 | PR01 | TOKYO |
| ARRANGEMENT | 2006/06/10 12:26:36.006 | TH02 | JT01 | PR02 | TOKYO |
| ARRANGEMENT | 2006/06/12 09:52:23.976 | TH03 | JT01 | PR02 | TOKYO |
| ARRANGEMENT | 2006/06/12 11:26:52.082 | TH04 | JT02 | PR01 | TOKYO |
| ARRANGEMENT | 2006/06/14 08:11:13.725 | TH05 | JT03 | PR03 | KANAGAWA |
| ARRANGEMENT | 2006/06/15 22:56:42.225 | TH06 | JT04 | PR02 | KANAGAWA |

FIG.36

| EVENT NAME | TIME STAMP | EVENT ID AND ASSOCIATED ID CANDIDATE | | | |
|---|---|---|---|---|---|
| | | ARRANGEMENT NO. | ORDER NO. | PRODUCT NO. | DELIVERY DESTINATION |
| ARRANGEMENT | 2006/06/10 20:52:33.727 | TH01 | JT01 | PR01 | TOKYO |
| ARRANGEMENT | 2006/06/10 12:26:36.006 | TH02 | JT01 | PR02 | TOKYO |
| ARRANGEMENT | 2006/06/12 09:52:23.976 | TH03 | JT01 | PR02 | TOKYO |
| ARRANGEMENT | 2006/06/12 11:26:52.082 | TH04 | JT02 | PR01 | TOKYO |
| ARRANGEMENT | 2006/06/14 08:11:13.725 | TH05 | JT03 | PR03 | KANAGAWA |
| ARRANGEMENT | 2006/06/15 22:56:42.225 | TH06 | JT04 | PR02 | KANAGAWA |

FIG.37

| EVENT NAME | TIME STAMP | EVENT ID AND ASSOCIATED ID CANDIDATE | | |
|---|---|---|---|---|
| | | ARRANGEMENT NO. | DELIVERY SERVICE | DELIVERY DESTINATION |
| DELIVERY | 2006/06/19 14:26:13.634 | TH01 | HS01 | TOKYO |
| DELIVERY | 2006/06/19 21:53:53.405 | TH02 | HS01 | TOKYO |
| DELIVERY | 2006/06/19 14:42:55.963 | TH03 | HS01 | TOKYO |
| DELIVERY | 2006/06/19 20:25:42.062 | TH04 | HS01 | TOKYO |
| DELIVERY | 2006/06/21 16:31:56.465 | TH05 | HS02 | KANAGAWA |
| DELIVERY | 2006/06/22 09:47:35.975 | TH06 | HS03 | KANAGAWA |

FIG.38

| EVENT NAME | TIME STAMP | EVENT ID AND ASSOCIATED ID CANDIDATE | | |
|---|---|---|---|---|
| | | ARRANGEMENT NO. | DELIVERY SERVICE | DELIVERY DESTINATION |
| DELIVERY | 2006/06/19 14:26:13.634 | TH01 | HS01 | TOKYO |
| DELIVERY | 2006/06/19 21:53:53.405 | TH02 | HS01 | TOKYO |
| DELIVERY | 2006/06/19 14:42:55.963 | TH03 | HS01 | TOKYO |
| DELIVERY | 2006/06/19 20:25:42.062 | TH04 | HS01 | TOKYO |
| DELIVERY | 2006/06/21 16:31:56.465 | TH05 | HS02 | KANAGAWA |
| DELIVERY | 2006/06/22 09:47:35.975 | TH06 | HS03 | KANAGAWA |

FIG.39

| EVENT NAME | TIME STAMP | EVENT ID AND ASSOCIATED ID CANDIDATE | | |
|---|---|---|---|---|
| | | SLIP NO. | ... | SLIP ISSUER |
| SLIP ISSUANCE | 05/04/10 | 3127 | ... | A |
| SLIP ISSUANCE | 05/04/16 | 3128 | ... | B |

FIG.40

| EVENT NAME | TIME STAMP | EVENT ID AND ASSOCIATED ID CANDIDATE | | |
|---|---|---|---|---|
| | | SLIP NO. | ... | SLIP ISSUER |
| APPROVAL | 05/04/12 | 3127 | ... | A |
| APPROVAL | 05/04/17 | 3128 | ... | B |

FIG.41

| EVENT NAME | TIME STAMP | EVENT ID AND ASSOCIATED ID CANDIDATE | | |
|---|---|---|---|---|
| | | SLIP NO. | ... | SLIP ISSUER |
| ORDER | 05/04/14 | 3127 | ... | A |

FIG.42

| EVENT NAME | TIME STAMP | EVENT ID AND ASSOCIATED ID CANDIDATE | | |
|---|---|---|---|---|
| | | SLIP NO. | ... | SLIP ISSUER |
| DELIVERY | 05/04/20 | 3127 | ... | A |

| EVENT NAME | TIME STAMP | EVENT ID AND ASSOCIATED ID CANDIDATE | | |
|---|---|---|---|---|
| | | SLIP NO. | ... | SLIP ISSUER |
| INSPECTION | 05/04/21 | 3127 | ... | A |

INFORMATION PROCESSING METHOD AND APPARATUS FOR BUSINESS PROCESS ANALYSIS

CROSS-REFERENCE TO RELATED APPLICATIONS

This application is a continuing application, filed under 35 U.S.C. section 111 (a), of International Application PCT/JP2006/318334, filed Sep. 15, 2006.

FIELD

This invention relates a data generation technique for a business process analysis.

BACKGROUND

For Business Process Re-engineering (BPR), it is necessary to analyze currently operated business systems in the company. For such a purpose, a technique disclosed, for example, in Japanese laid-open patent publication No. 2005-115494 is used. In this a publication, following matters are disclosed.

Namely, (1) event data, which is information representing execution states of respective applications allocated in different business systems, is collected according to methods corresponding to the respective applications and is queued into an event queue. Incidentally, in this publication, the event indicates a certain business was executed in the business systems, and is data including a start time and end time of the business and associated attributes. The event data is extracted according to event extraction definition allocated in the respective business systems by an application for the event data extraction for each business system. In each of the business systems, the extracted event data is converted into a common eXtensible Markup Language (XML) format to queue the converted data into an event queue of an event management apparatus managing the event data. For example, Java® Message Service (JMS) is utilized for this queuing.

(2) In the event management apparatus, the event data queued in the event queue is aggregated for each unit of the business data and stored in an event management database (DB) after associating the business data units. In this publication, the business data means data shared between businesses in a certain collected unit. (3) Narrowing the business data is carried out based on inputted retrieval condition (e.g. event occurrence period, associated attributes, and the like). (4) Data associated with the narrowed business data is expanded and displayed by a tree, and the processing from arbitrary data is tracked. (5) An event associated with the business data expanded by the tree is retrieved, and the business associated with this event is depicted by a tracking view to display the execution state of the current business flow. In this publication, the tracking is a method for confirming which business is executed or which business is not executed in the business process that is an entire business flow executed across the predefined business systems.

It is necessary for such a technique described in this publication to introduce the applications for the event data extraction for each business system, and the business systems have to be modified or loads unnecessary for the business execution is provided.

However, because modifying the business systems and/or providing the loads unnecessary for the business execution affects the currently operated business systems, it should be avoided even if it is for BPR.

SUMMARY

Therefore, an object of this invention is to provide a technique to generate data for the business process analysis without bad influence to the currently operating business systems.

An information processing method for a business process analysis, which relates to a first aspect of this invention, includes identifying a processing target field in a record generated in an analysis target system and stored in a data storage; and identifying data representing probability that the processing target field corresponds to a time stamp of an event by using definition data for each field in the record, which is stored in the data storage.

It becomes possible to identify data (e.g. confidence degree or ranking such as A, B or C) representing probability for the time stamp of the event, namely, occurrence time of the event, from existing data without affecting the business systems. Namely, it becomes possible to identify data concerning the event necessary for the business process analysis.

Incidentally, the aforementioned definition data may be schema information of a database. In such a case, the aforementioned identifying the data representing probability may include identifying a data type of the processing target field; and judging whether or not the data type of the processing target field is a data type representing the time stamp.

Moreover, the aforementioned definition data may include a field name. In such a case, the aforementioned identifying the data representing probability may include identifying data representing probability that the processing target field corresponds to a time stamp of an event, based on a character string contained in the field name of the processing target field. The definition data may be schema information or may be label data of Comma Separated Values (CSV) data. This is because the time stamp has a characteristic word, for example, in the end of the field name or the like.

Furthermore, the aforementioned identifying the data representing probability may include identifying data representing probability that the processing target field corresponds to a time stamp of an event, based on a field value of the processing target field. This is because the format of the field value, which is the time stamp, has a format of a characteristic character string such as YYYY/MM/DD hh:mm:ss.

Furthermore, as for the character string included in the field name of the processing target field, data representing lower probability may be identified in an order of a character string representing time, a character string representing a date and a character string representing a future time. The character string representing the future time is a character string such as the due date or plan, and the probability that the processing target field including the character string representing the future time corresponds to the timestamp is determined as being lower, for the purpose to identify the occurrence time of the event.

In addition, the aforementioned identifying the data representing probability may include identifying pertinent data of the processing target field based on the definition data for each field in the record and the field values stored in the data storage; and identifying the data representing the probability, which corresponds to the identified pertinent data of the processing target field by referring to a score table storing predefined characteristics of a field name or field value and corresponding data representing probability. In the score table, the data representing probability may be a specific numerical value. However, a pertinent level may be identified according to predetermined level classification.

Incidentally, the first aspect of this invention may further include presenting a user with the data representing probability that the processing target field corresponds to the time stamp of the event, so as to correspond to each field. By this presentation, the user may finally identify which field corresponds to the time stamp of the event. In such a case, the field value of the field, which corresponds to the time stamp of the event, may be collected in order to utilize the collected data in the following processing. Incidentally, the field whose probability is highest may be automatically extracted to present with the name or value of the extracted field or both of them. Furthermore, the time stamp of the event may be stored as event candidate data into an event candidate data storage, together with the event name, event ID, associated ID if it exists and the like, which are identified by another method. Moreover, the event data may be generated by associating IDs from the event candidate data and stored into an event data storage.

An information processing method for a business process analysis, which relates to a second aspect of this invention, includes identifying a processing target field in a record generated by an analysis target system and stored in a data storage; identifying a characteristic of a field value of the processing target field, which is stored in the data storage; and identifying data representing probability that the processing target field corresponds to an event ID of an event, based on whether or not the characteristic of the field value of the processing target field has a predetermined characteristic.

It becomes possible to identify data (e.g. confidence degree, or ranking such as A, B or C) representing probability for the event ID of the event, namely, identification data of the event from existing data without affecting the business systems. Namely, it becomes possible to identify data concerning the event necessary for the business process analysis.

In addition, the second aspect of the invention may further include, when the data representing the processing target field corresponds to the event ID of the event is not data representing denial, identifying second data representing probability that the processing target field corresponds to an event of an event ID, by using definition data for each field in a record, which is stored in the data storage. For instance, when the characteristic of the field value of the processing target field does not have a predetermined characteristic, the judgment is further conducted based on the definition data of the fields.

Incidentally, the aforementioned definition data may include data of a data type of each field. In addition, the aforementioned definition data may include key setting data. The schema information includes data representing whether or not the field is a primary key, for example. Therefore, when the schema information can be obtained, such data can be used.

Moreover, the aforementioned identifying the second data representing probability may include identifying pertinent data of the processing target field from the definition data for each field in the record, which is stored in the data storage; and identifying data representing probability, which corresponds to the pertinent data of the processing target field, by referring to a score table storing the predefined data type of the field or the predefined characteristic of the field and corresponding data representing probability. There is a case where in the score table, the data representing probability, is a specific numerical value. However, a level may be identified according to predetermined level classification. In addition, when there is no pertinent item in the score table, a predetermined value may be set.

Furthermore, the second aspect of the invention may further include presenting a user with the data representing probability that the processing target field corresponds to the event ID of the event, in association with each field. By this presentation, the user may finally identify which field is a field of the event ID of the event. In such a case, the field value of the field, which is the event ID of the event, may be collected to utilize it in the following processing. Incidentally, the field whose probability is highest may be automatically extracted to present the field name or field value or both of them. Furthermore, the event ID may be stored as event candidate data into an event candidate data storage, together with the event name, time stamp, associated ID if it exists and the like, which are identified by another method. In addition, the event data may be generated by associating IDs from the event candidate data and stored into an event data storage.

Furthermore, the aforementioned identifying the data representing probability may include judging whether or not the field values of the processing target field are unique in all of the records; and judging whether or not the field values of the processing target field include NULL. This is because the characteristic of the field value of the event ID has a characteristic that the field values are unique in all of the records and do not include NULL.

An information processing method for a business process analysis, which relates to a third aspect of the invention, include identifying a processing target field in a record generated by an analysis target system and stored in a data storage device; identifying a characteristic of a field value of the processing target field, which is stored in the data storage; and identifying data representing probability that the processing target field corresponds to an associated ID of an event, based on whether or not the characteristic of the field value of the processing target field has a predetermined characteristic.

It becomes possible to identify data (e.g. confidence degree, or ranking such as A, B or C) representing probability that the processing target field corresponds to the associated ID of the event, namely, an ID associated with the event ID, from existing data without affecting the business systems. Namely, it becomes possible to identify data concerning the event necessary for the business process analysis.

In addition, the third aspect of the invention may further include, when the data representing probability that the processing target field corresponds to the associated ID of the event is not data representing denial, identifying second data representing probability that the processing target field corresponds to the associated ID of the event, by using definition data for each field in the event, which is stored in the data storage. For example, when the field value of the processing target field does not have the predefined characteristic, the judgment is further conducted based on the definition data of the fields.

Incidentally, the aforementioned definition data may include data of a data type of each field. In addition, the aforementioned definition data may include key setting data. When the schema information can be obtained and for example, an auxiliary key is designated, such data can be used.

In addition, the aforementioned identifying the second data representing probability may include identifying pertinent data of the processing target field based on the definition data for each field in the record, which is stored in the data storage; and identifying the second data representing probability, which corresponds to the identified pertinent data of the processing target field, by referring a score table storing a predetermined data type or characteristic of the field and corresponding data representing probability. There is a case where, in the score table, the data representing probability is a specific numerical value. However a level may be identified according to predetermined level classification. In addition, when there is no pertinent item in the score table, a predetermined value or level may be set. Moreover, when the aforementioned pertinent data correspond to plural items, an item that has a greater value or a value that swerves from a central value may be adopted.

Furthermore, the third aspect of the invention may further include presenting a user with data presenting probability that the processing target field corresponds to the associated ID of the event, in association with each field. By this presentation, the user may further finally identify which field is a field of the associated ID of the event. In such a case, the field value of the field, which is the associated ID of the event, may be collected to utilize collected data in the following processing. Incidentally, the field whose probability is highest may be automatically extracted to present the field name or field value or both of them. Furthermore, the associated ID may be stored as event candidate data into an event candidate data storage, together with the event name, event ID, time stamp and the like, which are identified by another method. In addition, the event data may be generated by associating IDs from the event candidate data and stored into an event data storage.

Furthermore, the aforementioned identifying the data representing probability may include judging whether or not the field value of the processing target field has two or more values except NULL. This is because, in case of the associated ID, the field value has two or more values except NULL.

An information processing method for a business process analysis, which relates to a fourth aspect of the invention, include identifying, for each field in a record generated in an analysis target system and stored in a data storage, data representing probability that the field corresponds to a time stamp of an event, by using definition data for each field in the record, which is stored in the data storage; identifying a field designated as the time stamp by a user, based on the data representing probability that the field corresponds to the time stamp of the event or a field whose data representing probability that the field corresponds to the time stamp of the event is predetermined data; and identifying an event name based on a number of identified fields.

The property of the source table is specified according to the number of fields which are regarded as the time stamp. Therefore, the event name can be also identified.

For example, the aforementioned identifying the event name may include identifying a table name as the event name when the number of identified fields is single. For example, in case of an order DB, the "order" is identified as the event name.

In addition, the aforementioned identifying the event name may include identifying the event name based on the field name of the identified field, when the number of identified fields is plural. For example, in case of a table including plural events in one record, plural time stamps such as an order time, a slip issuance time, a delivery time, an inspection time and the like exist. In such a case, the event names such as "order", "slip issuance", "delivery" and "inspection" are identified.

Incidentally, the fourth aspect of the invention may further include identifying a characteristic of the field value of each field, which is stored in the data storage device; identifying data representing probability that the field corresponds to an event ID of an event, based on whether or not the characteristic of the field value of each field has a predetermined characteristic; and when the data representing probability that the field corresponds to the event ID of the event is not data representing denial, identifying second data representing probability that the field corresponds to the event ID of the event, by using the definition data for each filed in the record, which is stored in the data storage. According to this, the event ID can be also identified.

Furthermore, the fourth aspect of the invention may further include identifying the data representing probability that the field corresponds to an associated ID of the event, based on whether or not the characteristic of the field value of the field has a predetermined second characteristic; and when the data representing probability that the field corresponds to the associated ID of the event is not data representing denial, identifying second data representing probability that the field corresponds to the associated ID of the field, by using the definition data for each field in the record, which is stored in the data storage. According to this, the associated ID can also be further identified.

Incidentally, it is possible to create a program causing a computer to execute the methods according to the invention, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

BRIEF DESCRIPTION OF DRAWINGS

FIGS. 2A to 2D are diagrams to explain an outline of this embodiment of this invention;

FIG. 4A is a diagram depicting schema information of an order DB, and

FIG. 4B is a diagram depicting records in the order DB;

FIG. 5A is a diagram depicting schema information of a production DB, and FIG. 5B is a diagram depicting records in the production DB;

FIG. 6A is a diagram depicting schema information of an arrangement DB, and FIG. 6B is a diagram depicting records in the arrangement DB;

FIG. 7A is a diagram depicting schema information of a delivery DB, and

FIG. 7B is a diagram depicting records in the delivery DB;

FIG. 8A is a diagram depicting schema information of a product number DB, and FIG. 8B is a diagram depicting records in the product number DB;

FIG. 9A is a diagram depicting a data example of the order DB in a CSV format, and FIG. 9B is a diagram depicting an example that the data of the order DB is tabulated;

FIG. 10A is a diagram depicting a data example of the production DB in a CSV format, and FIG. 10B is a diagram depicting an example that the data of the production DB is tabulated;

FIG. 11A is a diagram depicting a data example of the arrangement DB in a CSV format, and FIG. 11B is a diagram depicting an example that the data of the arrangement DB is tabulated;

FIG. 12A is a diagram depicting a data example of the delivery DB in a CSV format, and FIG. 12B is a diagram depicting an example that the data of the delivery DB is tabulated;

FIG. 13A is a diagram depicting a data example of the product number DB in a CSV format, and FIG. 13B is a diagram depicting an example that the data of the product number DB is tabulated;

FIG. 15 is a diagram depicting an example of a time stamp confidence score table;

FIG. 17 is a diagram depicting an example of an event ID and associated ID candidate confidence score table;

FIG. 19 is a diagram depicting an example of a table including plural time stamps;

FIGS. 20A to 20E are diagrams, each depicting an example of an original table included in FIG. 19.

FIG. 22 is a diagram depicting an example of judgment display for each element of event candidate data of the order DB in case of data in a CSV format;

FIG. 23 is a diagram depicting an example of judgment display for each element of event candidate data of the production DB in case that the schema information exists;

FIG. 24 is a diagram depicting an example of judgment display for each element of event candidate data of the production DB in case of data in the CSV format;

FIG. 25 is a diagram depicting an example of judgment display for each element of event candidate data of the arrangement DB in case that the schema information exists;

FIG. 26 is a diagram depicting an example of judgment display for each element of event candidate data of the arrangement DB in case of data in the CSV format;

FIG. 27 is a diagram depicting an example of judgment display for each element of event candidate data of the delivery DB in case that the schema information exists;

FIG. 28 is a diagram depicting an example of judgment display for each element of event candidate data of the delivery DB in case of data in the CSV format;

FIG. 29 is a diagram depicting an example of judgment display for each element of event candidate data of the product number DB in case that the schema information exists;

FIG. 30 is a diagram depicting an example of judgment display for each element of event candidate data of the product number DB in case of data in the CSV format;

FIG. 31 is a diagram depicting an example of selection results for the respective elements of the event candidate data;

FIG. 32 is a diagram depicting an example of the event candidate data generated from data of the order DB in case that the schema information exists;

FIG. 33 is a diagram depicting an example of the event candidate data generated from data of the order DB in case of the data in the CSV format;

FIG. 34 is a diagram depicting an example of the event candidate data generated from data of the production DB in case that the schema information exists;

FIG. 35 is a diagram depicting an example of the event candidate data generated from data of the production DB in case of the data in the CSV format;

FIG. 36 is a diagram depicting an example of the event candidate data generated from data of the arrangement DB in case that the schema information exists;

FIG. 37 is a diagram depicting an example of the event candidate data generated from data of the arrangement DB in case of the data in the CSV format;

FIG. 38 is a diagram depicting an example of the event candidate data generated from data of the delivery DB in case that the schema information exists;

FIG. 39 is a diagram depicting an example of the event candidate data generated from data of the delivery DB in case of the data in the CSV format;

FIG. 40 is a diagram depicting an example of the event candidate data concerning slip issuance of FIG. 19;

FIG. 41 is a diagram depicting an example of the event candidate data concerning approval of FIG. 19;

FIG. 42 is a diagram depicting an example of the event candidate data concerning the order of FIG. 19;

DESCRIPTION OF EMBODIMENTS

Figure 1:
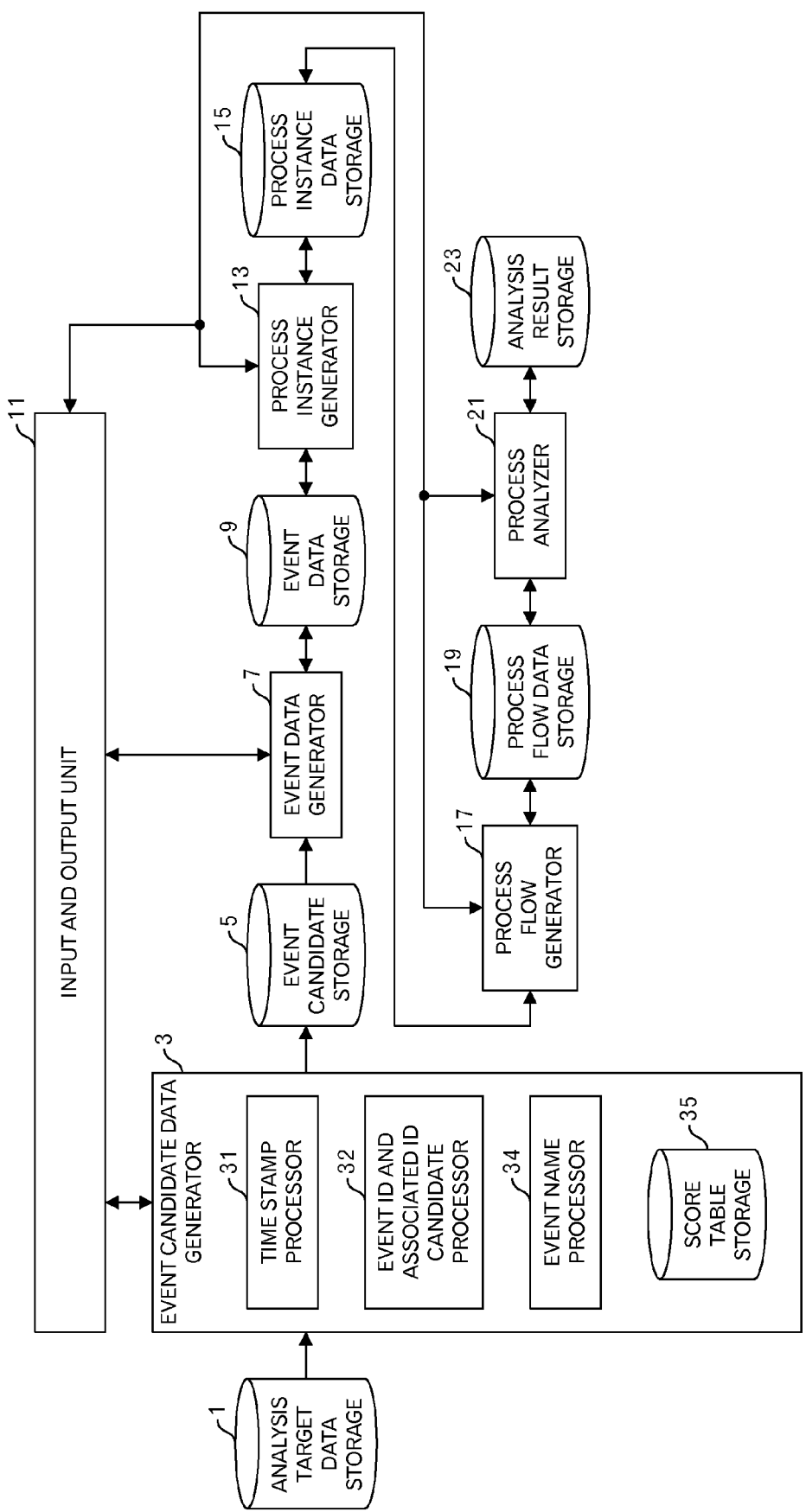
FIG. 1 is a functional block diagram of a business system analysis apparatus in an embodiment of this invention.

FIG. 1 depicts a functional block diagram of a business system analysis apparatus relating to one embodiment of this invention. The business system analysis apparatus relating to this embodiment includes an analysis target data storage 1 storing data (records of databases, log data, records of network DBs (NDBs), journals and the like, which are generated in a predetermined period) collected from one or plural analysis target systems; an event candidate data generator 3 that generates event candidate data from the analysis target data storage 1; an event candidate data storage 5 that stores the event candidate data generated by the event candidate data generator 3; an input and output unit 11, which is an interface with a user; an event data generator 7 that accepts user's instructions through the input and output unit 11 and generates event data; an event data storage 9 that stores the event data generated by the event data generator 7; a process instance generator 13 that generates process instances from the event data stored in the event data storage 9; a process instance data storage 15 that stores data of the process instances generated by the process instance generator 13; a process flow generator 17 that generates a process flow by using data stored in the process instances stored in the process instance data storage 15; a process analyzer 21 that carries out various process analysis processing by using data stored in the process flow data storage 19; and an analysis result storage 23 that stores analysis results by the process analyzer 21.

Incidentally, the input and output unit 11 operates, as the interface with the user, for the event candidate data generator 3, the process instance generator 13, the process flow generator 17 and the process analyzer 21. In addition, each processor may carry out a processing such as reading out processing results and the like to present the user with the read data through the input and output unit 11. However, there is a case where a processing to generate the process flow data from the event data is automatically carried out. In such a case, the process instance generator 13 and the process flow generator 17 do not utilize the interface except cases where intermediate results of the respective processing results are displayed.

In addition, the event candidate data generator 3, which is a main element in this embodiment, has a time stamp processor 31, an event ID and associated ID candidate processor 32, an event name processor 34 and a score table storage 35.

Next, rough processing contents of the business system analysis apparatus will be explained by using FIGS. 2A to 2D. First, the event candidate data generator 3 generates event candidate data from data for the business systems, which is stored in the analysis target data storage 1. An example of the event candidate data is depicted in FIG. 2A. In the example in FIG. 2A, records each including an event name, a time (a time stamp, which is an occurrence time of the event), a first value (value 1) other than the time, a second value (value 2) other than time and the like are extracted from, for example, one table (e.g. a database). Namely, data fields that are candidates of the event name and the time stamp, and further an event ID and an associated ID are identified.

Next, the event data generator 7 generates event data from the event candidate data stored in the event candidate data storage 5. An example of the event data is depicted in FIG. 2B. In the example of FIG. 2B, records respectively including the event name, the time (the time stamp which is the occurrence time of the event), the event ID (here, ID1) and other values and records respectively including the event name, the time (the time stamp), ID1, ID2 and the like are extracted from plural table (e.g. databases), and when one value of the field values of the ID1, which is the event ID of the record of a first event class (i.e. event type) is used as one of the field values of the ID2, which is an associated ID of the record of a second event class (i.e. event type), it is identified that each of the records (i.e. event instances) of the second event class is associated with a specific record (i.e. event instance) of the first event class. Such a processing itself for extracting the association between the events is not a main portion of this embodiment, and for example, is disclosed in Japanese Patent Application 2006-197294 (filed on Jul. 19, 2006) and its counterpart foreign applications, and those contents are incorporated into this application.

After that, the process instance generator 13 generates data of the process instances from the event data stored in the event data storage 9. An example of the process instance is depicted in FIG. 2C. In the example of FIG. 2C, four process instances are depicted as examples, and a series of event instances (specific events) are included in the respective process instances. Namely, a process instance includes a series of event instances (i.e. specific events respectively corresponding to specific records), which belong to the event class, such as "order", "slip issuance", "delivery" and "inspection". However, it is unnecessary that the event instances included in the process instance are originated from all of the event class, and plural event instances belonging to one event class may be included.

Then, the process flow generator 17 generates data of a process flow from data of the process instances stored in the process instance data storage 15. An example of the process flow is depicted in FIG. 2D. In the example of FIG. 2D, a business flow identified by abstracting the process instances is depicted. A processing itself to generate data of FIGS. 2C and 2D is not a main portion in this embodiment, and is disclosed in Japanese Patent Application 2006-136518 (filed on May 16, 2006) and its counterpart foreign applications, and the contents are incorporated into this application.

Furthermore, the process analyzer 21 carries out various analysis processing for data of the process flow, which is stored in the process flow data storage 19. An analysis processing for the process flow is not a main portion of this embodiment, and various analysis processing exists, and the details are omitted here. Incidentally, the analysis processing is also disclosed, for example, in Japanese Patent Application 2006-136518 (filed on May 16, 2006) and its counterpart foreign application, and its contents are incorporated into this application.

Figure 3:
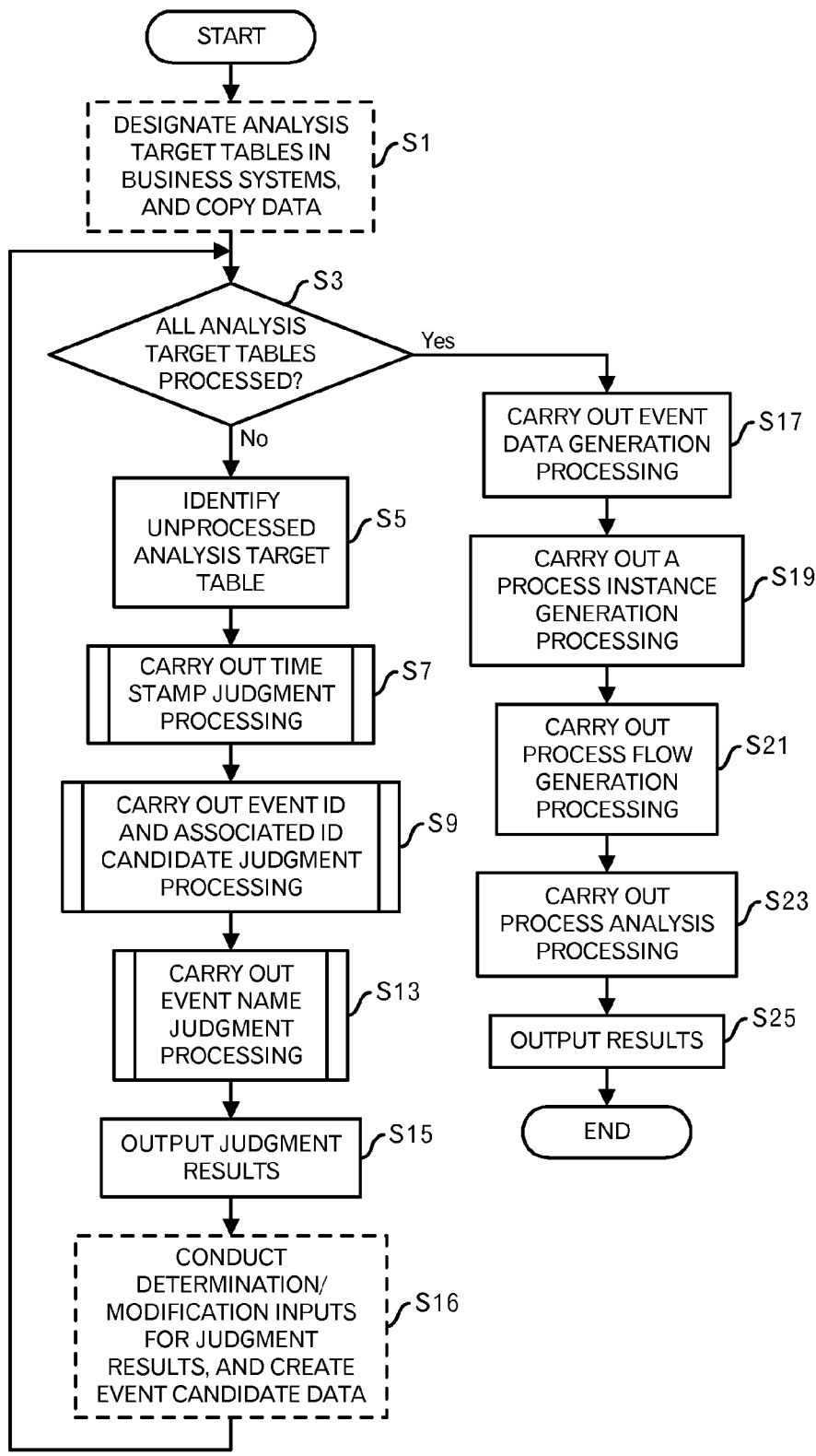
FIG. 3 is a diagram depicting a main processing flow in the embodiment of this invention.

Next, the detailed processing of the business system analysis apparatus depicted in FIG. 1 will be explained by using FIGS. 3 to 50. First, the user designates analysis target tables in the business systems, and makes their data copied and stored into the analysis target data storage 1 (FIG. 3: step S1). For example, an order DB, a production DB, an arrangement DB, a delivery DB and a product number DB are designated, and records generated and stored in a predetermined period are copied and stored into the analysis target data storage 1. Incidentally, when these DBs are relational databases, the schema information is also copied and stored into the analysis target data storage 1. Because this step is a processing conducted in advance by the user instructing a computer, this step is depicted by a dotted line block in FIG. 3.

For example, when the order DB is the relational database, the schema information as depicted in FIG. 4A and records as depicted in FIG. 4B are stored into the analysis target data storage 1. In the example of the schema information depicted in FIG. 4A, for each of the fields 1 to 4, the field name, key setting data, data type, record length and comments are registered. It is understood from FIG. 4A that the time is registered in the field 1, the order number, which is a primary key, is registered into the field 2, the area is registered in the field 3 and the order contents are registered in the field 4. Specifically, the records as depicted in FIG. 4B is stored, and when the schema information as depicted in FIG. 4A is obtained, contents of the records as depicted in FIG. 4B can easily be interpreted.

Similarly, when the production DB is the relational database, the schema information as depicted FIG. 5A and the records as depicted in FIG. 5B are stored into the analysis target data storage 1. In the example of the schema depicted in FIG. 5A, for each of the fields 1 to 5, the fields name, key setting data, data type, record length and comments are registered. It is understood from FIG. 5A that the time is registered in the field 1, the production number, which is a primary key, is registered in the field 2, an order number, which is an auxiliary key, is registered in the field 3, the product number, which is a auxiliary key, is registered in the field 4 and the due date is registered in the field 5. Specifically, the records as depicted in FIG. 5B are stored, and when the schema information as depicted in FIG. 5A is obtained, the contents of the records as depicted in FIG. 5B can easily be interpreted.

In addition, when the arrangement DB is the relational database, the schema information as depicted in FIG. 6A and records as depicted in FIG. 6B are stored into the analysis target data storage 1. In the example of the schema information depicted in FIG. 6A, for each of the fields 1 to 5, the field name, key setting data, data type, record length and comments are registered. It is understood from FIG. 6A that the time is registered in the field 1, the arrangement number, which is a primary key, is registered in the field 2, the order number, which is an auxiliary key, is registered in the field 3, the production number, which is the auxiliary key, is registered in the field 4 and a delivery destination is registered in the field 5. Specifically, the records as depicted in FIG. 6B are stored, and when the schema information as depicted in FIG. 6A are obtained, the contents of the records as depicted in FIG. 6B can easily be interpreted.

Furthermore, when the delivery DB is the relational database, the schema information as depicted in FIG. 7A and records as depicted in FIG. 7B are stored in the analysis target data storage 1. In the example of the schema information as depicted in FIG. 7A, for each of the fields 1 to 4, the fields name, key setting data, data type, record length and comments are registered. It is understood from FIG. 7A that the time is registered in the field 1, the arrangement number, which is a primary key, is registered in the field 2, the delivery service, which is the auxiliary key, is registered in the field 3, and the delivery destination is registered in the field 4. Specifically, the records as depicted in FIG. 7B are stored, and when the schema information as depicted in FIG. 7A is obtained, the contents of the records as depicted in FIG. 7B can easily be interpreted.

Moreover, when the product number DB is the relational database, the schema information as depicted in FIG. 8A and records as depicted in FIG. 8B are stored in the analysis target data storage 1. In the example of the schema information depicted in FIG. 8A, for each of the fields 1 and 2, the field name, key setting data, data type, record length and comments are registered. It is understood from FIG. 8A that the product number, which is the primary key, is registered in the field 1, and the product name is registered in the field 2. Specifically, the records as depicted in FIG. 8B are stored, and when the schema information as depicted in FIG. 8A is obtained, the contents of the records as depicted in FIG. 8B can easily be interpreted.

On the other hand, when data of the order DB is obtained in the CSV format, data as depicted in FIG. 9A is stored into the analysis target data storage 1. In the example of FIG. 9A, label data such as the time, the order number, the area and the order contents is included in the header, and after the header, data is enumerated in an order of the label, and data is sectioned by commas. When the data format of FIG. 9A is converted to a table format in order to make FIG. 9A easily understood, FIG. 9B is obtained. Namely, a table including a column of the time, a column of the order number, a column of the area and a column of the order contents is obtained. Because there is no schema information, all data is stored as character strings. In addition, there is no key setting data.

Similarly, when data of the production DB is obtained, data as depicted in FIG. 10A is stored in the analysis target data storage 1. In the example of FIG. 10A, the label data of the time, the production number, the order number, the product number and the due date is contained in the header, and after the header, data is enumerated in an order of the label, and data is sectioned by commas. When a data format is converted into a table format in order to make FIG. 10A easily understood, a table as depicted in FIG. 10B is obtained. Namely, the table includes a column of the time, a column of the production number, a column of the order number, a column of the product number and a column of the due date.

In addition, when data of the arrangement DB is obtained in the CSV format, data as depicted in FIG. 11A is stored into the analysis target data storage 1. In the example of FIG. 11A, the label data of the time, the arrangement number, the order number, the product number and the delivery destination is contained in the header, and after the header, data is enumerated in an order of the label, and data is sectioned by commas. When the data format is converted into the table format in order to make FIG. 11A easily understood, a table as depicted in FIG. 11B is obtained. Namely, the table including a column of the time, a column of the arrangement number, a column of the order number, and a column of the product number and a column of the delivery destination is obtained.

Furthermore, when data of the delivery DB is obtained in the CSV format, data as depicted in FIG. 12A is stored into the analysis target data storage 1. In the example of FIG. 12A, the label data of the time, the arrangement number, the delivery service and the delivery destination is contained in the header, and after the header, data is numerated in an order of the label, and data is sectioned by commas. When the data format is converted into the table format in order to make FIG. 12A easily understood, a table as depicted in FIG. 12B is obtained. Namely, the table including a column of the time, a column of the arrangement number, a column of the delivery service and a column of the delivery destination is obtained.

In addition, when data of the product DB is obtained in the CSV format, data as depicted in FIG. 13A is stored into the analysis target data storage 1. In the example of FIG. 13A, the label data of the product number and the product name is contained in the header, and after the header, data is enumerated in an order of the label, and data is sectioned by commas. When the data format is converted into the table format in order to make FIG. 13A easily understood, a table as depicted in FIG. 13B is obtained. Namely, the table including a column of the product number and a column of the product name is obtained.

For example, the event candidate data generator 3 of the business system analysis apparatus judges whether or not all of the analysis target tables have been processed (step S3). When an unprocessed analysis target table exists, the event candidate data generator 3 identifies one unprocessed analysis target table (step S5). Then, the event candidate data generator 3 carries out a time stamp judgment processing (step S7). This time stamp judgment processing will be explained by using FIGS. 14 and 15.

Figure 14:
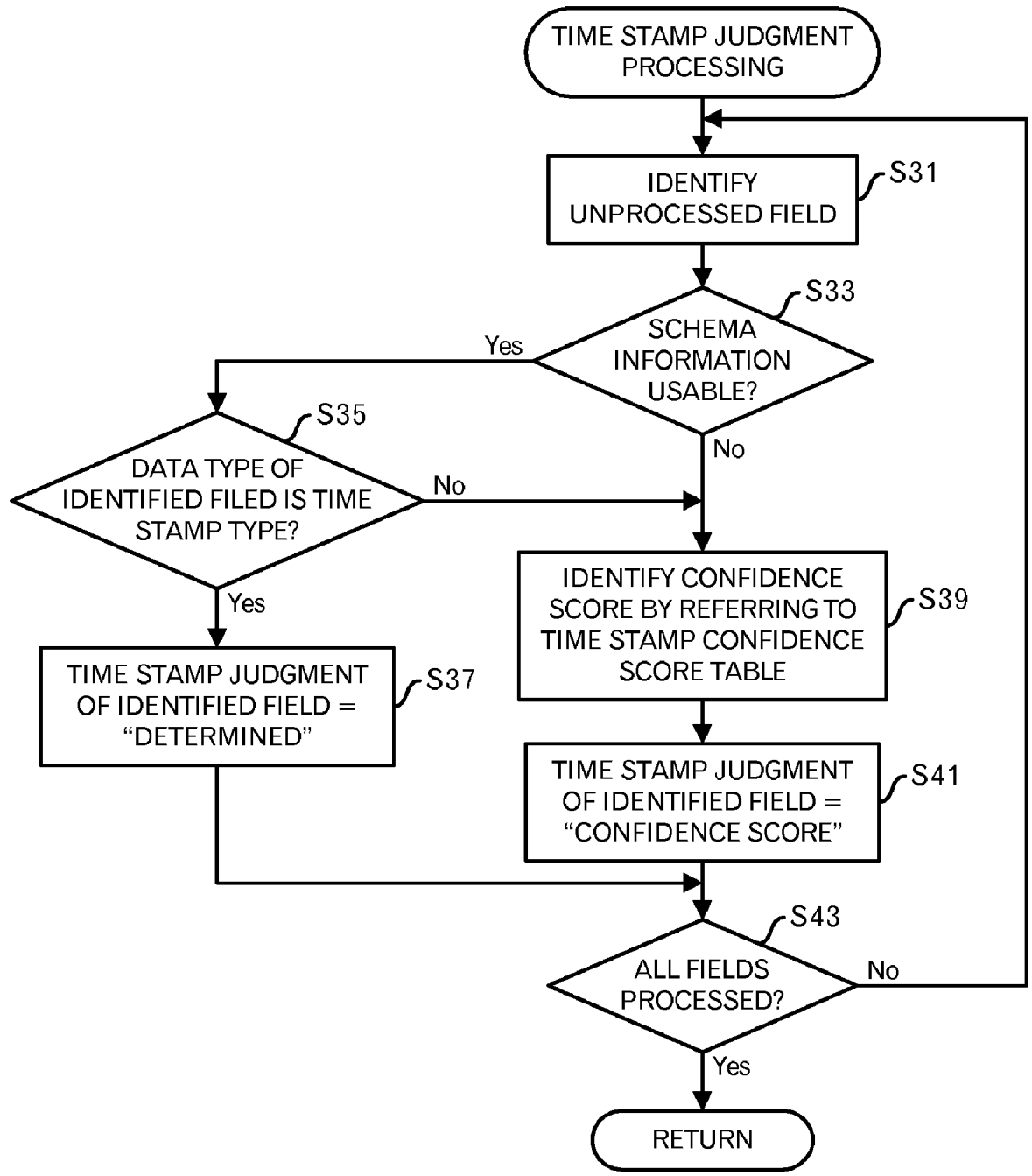
FIG. 14 is a diagram depicting a processing flow of a time stamp judgment processing.
Figure 16:
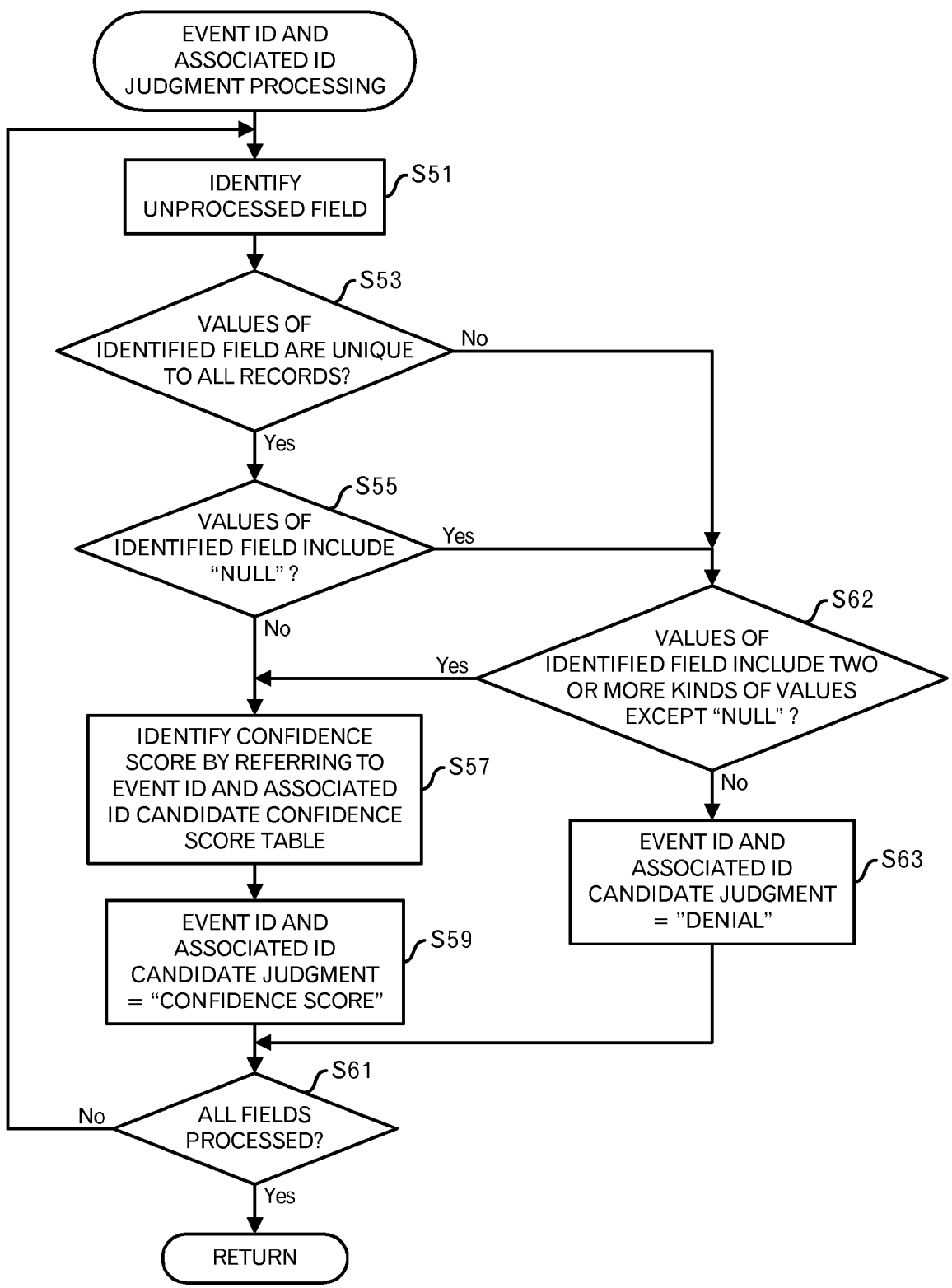
FIG. 16 is a diagram depicting a processing flow of an event ID and associated ID candidate judgment processing.

First, the time stamp processor 31 of the event candidate data generator 3 identifies one unprocessed field in the analysis target table by referring to the analysis target data storage 1 (FIG. 14: step S31). Then, the time stamp processor 31 judges whether or not the schema information of the analysis target table can be used in the analysis target data storage 1 (step S33).

When the schema information can be used, the time stamp processor 31 identifies a data portion for a processing target field in the schema information, and judges whether or not a data type of the processing target field in the identified data portion is a time stamp type (step S35). When the data type of the processing target field is not the time stamp type, the processing shifts to step S39. For example, when data as depicted in FIGS. 9A to 13A is processed, there is no scheme information. Therefore, the processing shifts to the step S39.

On the other hand, when it is judged that the data type of the processing target field is the time stamp type, the time stamp processor 31 sets "determined" to time stamp judgment of the processing target field, and stores the time stamp judgment data into a storage device such as a main memory (step S37). Then, the processing shifts to step S43.

For example, in case of the schema information as depicted in FIG. 4A, because the data type of the field 1 is the time stamp type, the time stamp judgment="determined" is set when the field 1 is the processing target field. In case of the schema information as depicted in FIG. 5A, because the data type of the field 1 is the time stamp type, the time stamp judgment="determined" is set when the field 1 is the processing target field. FIGS. 6A and 7A are the same as the aforementioned cases. In case of FIG. 8A, the processing shifts from the step S35 to the step S39.

When it is judged at the step S33 that the schema information cannot be used, or when the data type of the processing target filed is not the time stamp type, the time stamp processor 31 identifies a confidence degree based on a pertinent data portion of the processing target field in the schema information, label data representing the field name of the processing target field and the field value of the processing target field by referring to a time stamp confidence score table stored in the score table storage 35 (step S39).

An example of the time stamp confidence score table is depicted in FIG. 15. In the example of FIG. 15, 1% is set as the confidence score when the data type of the field is the variable length character string, 5% is set as the confidence score when the data type of the field is real, 90% is set as the confidence score when the end of the field name is "time" or the like, 70% is set as the confidence score when the end of the field name is "date", "day" or the like and does not contain "time" or the like, 10% is set as the confidence score when the field name includes a word or phases representing a future timing such as "plan", "due date" or the like, 5% is set as the confidence score when the character string of the field value contains a character other than characters associated with the time, such as the name of an era (e.g. symbol), "/". ":". "", ",", "-", numeral, space and the like, 90% is set as the confidence score when the character string in the field value is in a format "YYYY/MM/DD hh:mm:ss", 70% is set as the confidence score when the character string of the field value is in a format "YYYY/MM/DD", 30% is set as the confidence score when the same field values are contained in the field, and 50% is set as the confidence score when there is no pertinent item in the score table.

For example, in case of the schema information as depicted in FIG. 4A and the records as depicted in FIG. 4B, the confidence score 5% is identified for the field 2, because the character other than the characters associated with the time is contained in the field values. Similarly, the confidence score 5% is also identified for the field 3, because the character other than the characters associated with the time is contained in the field values. Furthermore, the confidence score 1% is identified for the field 4, because the data type is the variable length character string. Incidentally, because the character other than the characters associated with the time is contained in the field values of the field 4, plural items in the time stamp confidence score table are applicable to the field 4. In such a case, a value, which is further away from the central value 50%, is adopted in this embodiment. Namely, the confidence score 1% is adopted rather than the confidence score 5% applicable when the field value contains the character other than the characters associated with the time.

On the other hand, in case of FIG. 9A, in which the schema information does not exist, the confidence score 90% is identified for the field 1, because the character string of the field value is in the format "YYYY/MM/DD hh:mm:ss". The fields 2 and 3 are the same as the case of FIGS. 4A and 4B. However, the confidence score 5% is identified for the field 4, because the data type of the field cannot be identified and it is judged that the field value contains the character other than the characters associated with the time.

Moreover, in case of the schema information as depicted in FIG. 5A and the records as depicted in FIG. 5B, the confidence score 5% is identified for the fields 2 to 4, because the field value contains the character other than the characters associated with the time. Because the character string of the field name in the field 5 contains "due date", the confidence score 10% is identified for the field 5. Incidentally, because the character string of the field value in the field 5 is in the format "YYYY/MM/DD", plural items in the time stamp confidence score table are applicable to the field 5. In such a case, a value, which is further away from the central value 50%, is adopted in this embodiment. Namely, 10% is adopted rather than the confidence score 70% applicable when the character string of the field value is in the format "YYYY/MM/DD". In case of FIG. 10A, in which the schema information does not exist, the confidence score 90% is identified for the field 1, because the character string of the field value is in the format "YYYY/MM/DD hh:mm:ss". As for the fields 2 to 5, because the data type can not be identified, the same results as the case the schema information exists are obtained.

Furthermore, in case of the schema information as depicted in FIG. 6A and the records as depicted in FIG. 6B, the confidence score 5% is identified for the fields 2 to 5, because the field values include the character other than the characters associated with the time. In case of FIG. 11A, in which the schema information does not exist, the confidence score 90% is identified for the field 1, because the character string of the field value is in the format "YYYY/MM/DD hh:mm:ss". Because the data type can not be identified for the fields 2 to 5, the same results as the case where the schema information exists are obtained.

Moreover, in case of the schema information as depicted in FIG. 7A and the records as depicted in FIG. 7B, the confidence score 5% is identified for the fields 2 to 4, because the field values include the character other than characters associated with the time. In case of FIG. 12A in which the schema information does not exist, the confidence score 90% is identified for the field 1, because the character string of the field value is in the format "YYYY/MM/DD hh:mm:ss". Because the data type can not be identified for the fields 2 to 4, the same results as the case where the schema information exists are obtained.

Furthermore, in case of the schema information as depicted in FIG. 8A and the records as depicted in FIG. 8B, the confidence score 5% is identified for the fields 1 and 2, because the field values include the character other than the characters associated with the time. In case of FIG. 13A in which the schema information does not exist, because the data type can not be identified, the same results as the case where the schema information exists are obtained.

Returning to the explanation of FIG. 14, the time stamp processor 31 sets the identified confidence score to the time stamp judgment of the processing target field (step S41). The aforementioned numerical value is identified.

Then, the time stamp processor 31 judges whether or not all fields have been processed in the processing target table (step S43). When an unprocessed field exists, the processing returns to the step S31. On the other hand, when all of the fields have been processed, the processing returns to the original processing.

Thus, the greater confidence score is set to the field whose probability that the field corresponds to the time stamp of the event is high. In addition, when it is apparent from the data type that the field corresponds to the time stamp, "determined" is set as data representing probability.

Returning to the explanation of FIG. 3, next, the event ID and associated ID candidate processor 32 carries out an event ID and associated ID candidate judgment processing (step S9). This event ID and associated ID candidate judgment processing will be explained in FIGS. 16 and 17.

The event ID and associated ID candidate processor 32 identifies one unprocessed field in the analysis target table stored in the analysis target data storage 1 (step S51). Then, the event ID and associated ID candidate processor 32 judges whether or not field values of the processing target field are unique among all records (step S53). When the field values of the processing target field are not unique among all records, namely, records whose values in the processing target field are identical exist, the processing shifts to step S62.

Because the field of the event ID is a storage field of the event identifier, the field values are never identical. Therefore, when the same values exist in the field, it can be judged that the field value is not the event ID.

On the other hand, when the field values in the processing target field are unique among all records, the event ID and associated ID candidate processor 32 judges whether or not the field values of the processing target field, which are stored in the analysis target data storage 1, include NULL (step S55). When the field values of the processing target field include "NULL", the processing shifts to the step S62. Because the field of the event ID is the storage field of the event identifier, "NULL" never appears as the field value. When the field values of the processing target field are not unique among all records or when the field values of the processing target field include "NULL", the event ID and associated ID candidate processor 32 judges whether or not the number of kinds of the field values (from which "NULL" is excluded) of the processing target field is equal to or greater than 2 (step S62). When the number of kinds of the field values (from which "NULL" is excluded) of the processing target field is less than 2, the event ID and associated ID candidate processor 32 sets "denial" to event ID and associated ID candidate judgment, and stores the event ID and associated ID candidate judgment data into the storage device such as the main memory (step S63). Then, the processing shifts to the step S61. The associated ID is a value representing that a certain event corresponds to which other event. Therefore, when the number of kinds of the field values (from which "NULL" is excluded) is less than 2, any meaningful result cannot be obtained.

For example, in case of the table as depicted in FIGS. 4B and 9B, as for each of the fields 1, 2 and 4, the same field values do not exist, and as for the field 3, the same field values exist. However, two or more kinds of field values other than "NULL" exist. Therefore, "denial" is not set to the event ID and associated ID candidate judgment for the fields 1 to 4.

In addition, in case of the table as depicted in FIGS. 5B and 10B, as for the fields 1 and 2, the same field values do not exist, and as for the fields 3 to 5, the same field values exist. However, two or more kinds of field values other than "NULL" exist. Therefore, "denial" is not set to the event ID and associated ID candidate judgment for the fields 1 to 5.

Furthermore, in case of the table as depicted in FIGS. 6B and 11B, as for the fields 1 and 2, the same field values do not exist, and as for the fields 3 to 5, the same field values exists. However two or more kinds of field values other than "NULL" exist. Therefore, "denial" is set to the event ID and associated ID candidate judgment for the fields 1 to 5.

Moreover, in case of the table as depicted in FIGS. 7B and 12B, as for the fields 1 and 2, the same field values do not exist, and as for the fields 3 and 4, the same field values exist. However two or more kinds of field values exist. Therefore, "denial" is set to the event ID and associated ID candidate judgment for the fields 1 to 4.

Furthermore, in case of the table as depicted in FIGS. 8B and 13B, as for the fields 1 and 2, the same field values do not exist. Therefore, "denial" is not set to the event ID and associated ID candidate judgment for the fields 1 and 2.

When it is judged at the step S55 that the field values of the processing target field do not include "NULL", or when it is judged at the step S62 that the number of kinds of the field values of the processing target field is two or more, the event ID and associated ID candidate processor 32 identifies the confidence degree based on a pertinent data portion of the processing target field in the schema information, the label data representing the field name of the processing target field and the field values of the processing target field by referring to the event ID and associated ID candidate confidence score table stored in the score table storage 35 (step S57). However, when the pertinent item does not exist in the event ID and associated ID candidate confidence score table, the confidence score 50% is identified.

An example of the event ID and associated ID candidate confidence score table is depicted in FIG. 17. In the example of FIG. 17, when the data type of the field is the variable length character string, the confidence score 1% is set, when the data type of the field is real, the confidence score 5% is set, when the data type of the field is integer, the confidence score 80% is set, when the data type of the field is fixed length character string, the confidence score 70% is set, when the data type of the field is the time stamp or date, the confidence score 10% is set, and when the field name is designated as the primary key, the confidence score 80% is set. Although items for the character string of the field value or field name are not defined here, some items for the character string may be defined. When the item for the field value is defined, it is referenced at the step S57.

For example, in case of the schema information as depicted in FIG. 4A, the confidence score 10% is identified for the field 1, because the data type is the time stamp, the confidence score 80%, which is further away form 50%, is adopted for the field 2, because the data type is the fixed length character string and the primary key is assigned to the field 2, the confidence score 70% is identified for the field 3, because the data type is the fixed length character string, and the confidence score 1% is identified for the field 4, because the data type is the variable length character string. In a case where the schema information as depicted in FIG. 9A does not exist, the confidence score 50% is identified for the fields 1 to 4, because the pertinent item does not exist in the event ID and associated ID candidate confidence degree.

For example, in case of the schema information as depicted in FIG. 5A, because the data type is the time stamp, the confidence score 10% is set for the field 1. Because the data type is the fixed length character string and the primary key is designated to the field 2, the confidence score 80%, which is further away from 50%, is adopted for the field 2. Because the data type is the fixed length character string, the confidence score 70% is identified for the fields 3 and 4, and because the data type is the time stamp, the confidence score 10% is set for the field 5. In case where the schema information as depicted in FIG. 10A does not exist, because any pertinent item does not exist in the event ID and associated ID candidate confidence score table, the confidence score 50% is identified for the fields 1 to 5.

For example, in case of the schema information as depicted in FIG. 6A, the confidence score 10% is identified for the field 1, because the data type is the time stamp, the confidence score 80%, which is further away from 50%, is identified for the field 2, because the data type is the fixed length character string and the primary key is designated to the field 1, and the confidence score 70% is identified for the fields 3 to 5, because the data type is the fixed length character string. In case where the schema information as depicted in FIG. 11A does not exist, the confidence score 50% is identified for the fields 1 to 5, because any pertinent items do not exist in the event ID and associated ID candidate confidence score table.

For example, in case of the schema information as depicted in FIG. 7A, the confidence score 10% is identified for the field 1, because the data type is the time stamp, the confidence score 80%, which is further away from 50%, is adopted for the field 2, because the data type is the fixed length character string and the primary key is designated to the field 2, and the confidence score 70% is identified for the fields 3 and 4, because the data type is the fixed length character string. In the example that the schema information as depicted in FIG. 12A does not exist, the confidence score 50% is identified for the fields 1 to 4, because any pertinent items do not exist in the event ID and associated ID candidate confidence score table.

For example, in case of the schema information as depicted in FIG. 8A, the confidence score 80%, which is further away from 50%, is adopted for the field 1, because the data type is the fixed length character string and the primary key is designated to the field 1, and the confidence score 70% is adopted for the field 2, because the data type is the fixed length character string. In the example that the schema information as depicted in FIG. 13A does not exit, the confidence score 50% is identified for the fields 1 and 2, because any pertinent items do not exist in the event ID and associated ID candidate confidence score table.

Then, the event ID and associated ID candidate processor 32 sets the confidence score identified at the step S57 to the event ID and associated ID candidate judgment, and stores the event ID and associated ID candidate judgment data into the storage device such as the main memory (step S59).

After that, the event ID and associated ID candidate processor 32 judges whether or not all fields have been processed in the processing target table (step S61), and when an unprocessed field exists, the processing returns to the step S51. On the other hand, when all of the fields have been processed, the processing returns to the original processing.

Thus, the greater confidence score is identified for the field whose probability that the field corresponds to the event ID or associated ID is high. In addition, "denial" is identified as the data representing probability that the field corresponds to the event ID or associated ID, when the probability that the field corresponds to the event ID or associated ID is completely zero.

Returning to the explanation of FIG. 3, next, the event name processor 34 of the event candidate data generator 3 carries out an event name judgment processing (step S13). This event name judgment processing will be explained by using FIGS. 18 to 20.

First, the event name processor 34 counts the number of fields whose confidence score, which is the processing result of the time stamp judgment processing, is equal to or greater than a predetermined confidence score, and which can be considered to be the time stamp field (step S91). For example, 70% or more is set to a threshold as the predetermined confidence score. Naturally enough, the field for which "determined" is identified is the time stamp field. In the aforementioned example, except the product number DB, the number of fields is "1", because the field whose field name is the time is judged as the time stamp field. As for the product number DB, the number of fields is "0", because there is no field, which can be considered to be time stamp field.

Then, the event name processor 34 judges whether or not the number of fields for the time stamp is "0" (step S93). When the number of fields is "0", the event name processor 34 sets data representing the analysis target table is excluded from the tables to be analyzed in the following processing (step S95). The table having no time stamp (e.g. the product number table) is not judged as a table associated with the events, which occur during the business process. Then, the processing returns to the original processing.

On the other hand, when the number of fields of the time stamp is not "0", the event name processor 34 judges whether or not the number of fields is "1" (step S97). When the number of fields of the time stamp is "1", the event name processor 34 sets the table name to the event name, and stores the event name into the storage device such as the main memory (step S99). In the aforementioned example, in case of the order DB, "order" is identified as the event name, in case of the production DB, "production" is identified as the event name, in case of the arrangement DB, "arrangement" is identified as the event name, and in case of the delivery DB, "delivery" is identified. Then, the processing returns to the original processing.

In addition, when the number of fields of the time stamp is plural, the event name processor 34 sets the field name of the field, which is considered as the time stamp, to the event name, and stores the event name into the storage device such as the main memory (step S101). Then, the processing returns to the original processing.

For example, when the table as depicted in FIG. 19 is the processing target table, the step S101 is executed. In the example of FIG. 19, the fields "slip issuance time", "approval time", "order time", "delivery time", and "inspection time" are respectively considered as the field of the time stamp of the event, and a format that plural events are registered in one record is adopted. Such a table is considered as a table to which the slip issuance table, approval table, order table, delivery table and inspection table, which are depicted in FIGS. 20A to 20E, are unified. Therefore, in such a case, "slip issuance", "approval", "order", "delivery" and "inspection" are respectively identified as the event names.

By carrying out the aforementioned processing, a table corresponding to an event, which occurs during the business process, can be identified, and the event names can also be extracted.

Figures 18, 21:
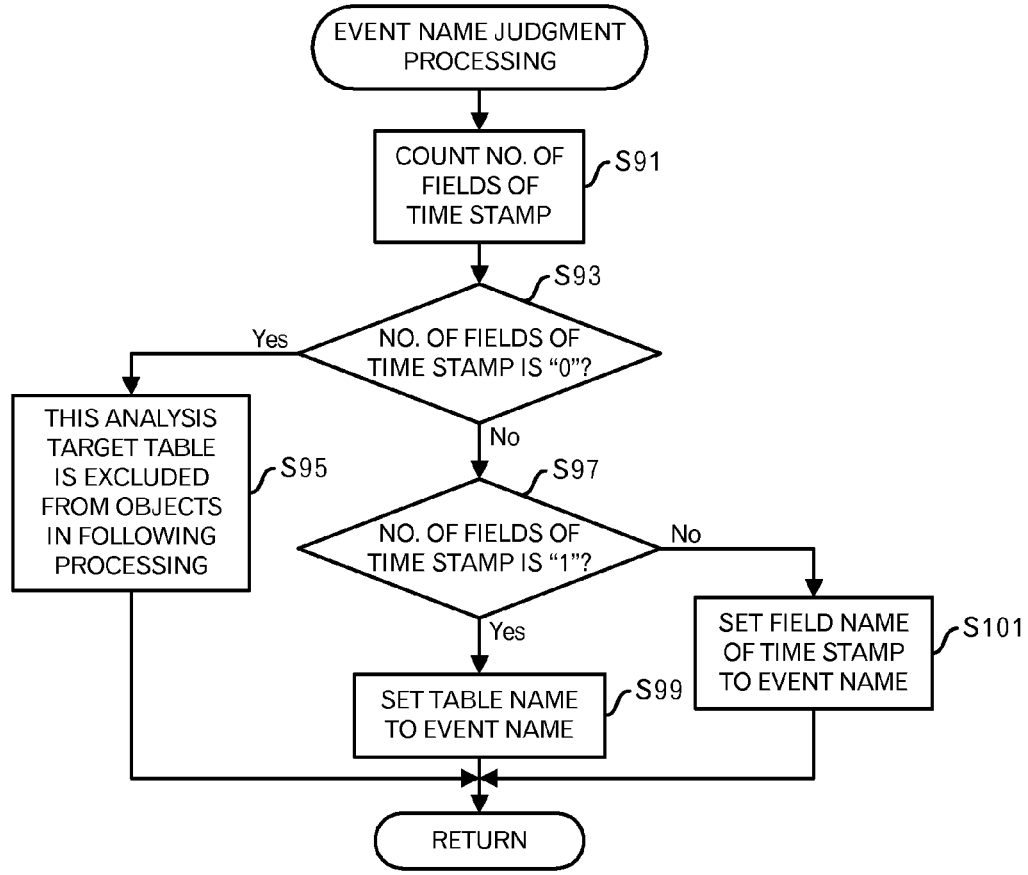
FIG. 18 is a diagram depicting a processing flow of an event name judgment processing.
FIG. 21 is a diagram depicting an example of judgment display for each element of event candidate data of the order DB in case that the schema information exists.

Returning to the explanation of FIG. 3, next, the event candidate data generator 3 presents the user with the judgment results through the input and output unit 11 (step S15). For example, in case of the order DB in the relational database format as depicted in FIGS. 4A and 4B, data as depicted in FIG. 21 is presented to the user. In the example of FIG. 21, as for each of the time field, order number field, area field and order contents field, the judgment results at the steps S7 to S13 are presented. Incidentally, as for the event name, "denial" is indicated for all fields, because the table name is identified as the event name. According to this example, it is understood that, as for the time stamp field, "determined" is indicated for the time field, and the probability that the order number field or area field corresponds to the event ID or associated ID is high.

In addition, in case of the order DB in the CSV format as depicted in FIG. 9A, data as depicted in FIG. 22 is presented for the user. In the example of FIG. 22, the judgment results of the steps S7 to S13 are presented for each of the time field, order number field, area field and order contents field. Incidentally, as for the event name, "denial" is indicated for all fields, because the table name is identified as the event name. According to this presentation, the probability that the time field corresponds to the time stamp is high, and the probabilities that respective fields correspond to the event ID or associated ID are the same.

For example, in case of the production DB in the relational database format as depicted in FIGS. 5A and 5B, data as depicted in FIG. 23 is presented to the user. In the example of FIG. 23, the judgment results of the step S7 to S13 are presented for each of the time field, production number field, order number field, product number field and due date field. Incidentally, as for the event name, "denial" is indicated for all fields, because the table name is identified as the event name. According to this example, it is understood that, as for the time stamp field, "determined" is indicated for the time field, and the probability that the production number field, order number field or product number field corresponds to the event ID or associated ID is high.

In addition, in the production DB in the CSV format as depicted in FIG. 10A, data as depicted in FIG. 24 is presented to the user. In the example of FIG. 24, the judgment results of the step S7 to S13 are presented for each of the time field, production number field, order number field, product number field and due date field. Incidentally, as for the event name, "denial" is indicated for all fields, because the table name is identified as the event name. According to this example, it is understood that the probability the time field corresponds to the timestamp is high, and the probability that the respective fields correspond to the event ID or associated ID is the same.

For example, in case of the arrangement DB in the relational database format as depicted in FIGS. 6A and 6B, data as depicted in FIG. 25 is presented to the user. In the example of FIG. 25, the judgment results of the step S7 to S13 are presented for each of the time field, arrangement number field, order number field, product number field and delivery destination field. Incidentally, as for the event name, "denial" is indicated for all fields, because the table name is identified as the event name. According to this example, it is understood that, as for the time stamp field, "determined" is indicated for the time field, and the probability that the arrangement number field, order number field, product number field or delivery destination field corresponds to the event ID or associated ID is high.

For example, in case of the arrangement DB in the CSV format as depicted in FIG. 1A, data as depicted in FIG. 26 is presented to the user. In the example of FIG. 26, the judgment results of the step S7 to S13 are presented for each of the time field, arrangement number field, order number field, product number field and delivery destination field. Incidentally, as for the event name, "denial" is indicated for all fields, because the table name is identified as the event name. According to this example, it is understood that, as for the time stamp field, "determined" is indicated for the time field, and the probabilities that the respective fields correspond to the event ID or associated ID are equivalent.

For example, in case of the delivery DB in the relational database format as depicted in FIGS. 7A and 7B, data as depicted in FIG. 27 is presented to the user. In the example of FIG. 27, the judgment results of the step S7 to S13 are presented for each of the time field, arrangement number field, delivery service field and delivery destination field. Incidentally, as for the event name, "denial" is indicated for all fields, because the table name is identified as the event name. According to this example, it is understood that, as for the time stamp field, "determined" is indicated for the time field, and the probability that the arrangement number field, delivery service field or delivery destination field corresponds to the event ID or associated ID is high.

For example, in case of the delivery DB in the CSV format as depicted in FIG. 12A, data as depicted in FIG. 28 is presented to the user. In the example of FIG. 28, the judgment results of the step S7 to S13 are presented for each of the time field, arrangement number field, delivery service field and delivery destination field. Incidentally, as for the event name, "denial" is indicated for all fields, because the table name is identified as the event name. According to this example, it is understood that, as for the time stamp field, "determined" is indicated for the time field, and the probabilities that the respective fields correspond to the event ID or associated ID are equivalent.

For example, in case of the product number DB in the relational database format as depicted in FIGS. 8A and 8B, data as depicted in FIG. 29 is presented to the user. In the example of FIG. 29, the judgment results of the step S7 to S13 are presented for each of the product number field and product name field. Incidentally, as for the event name, "denial" is indicated for all fields, because it is judged that there is no time stamp and the product number DB is excluded from the tables to be analyzed in the following processing. According to this example, it is understood that the probability that the time stamp field exists is very low, and the probability that the product number field or product name field corresponds to the event ID or associated ID is high.

For example, in case of the product number DB in the CSV format as depicted in FIG. 13A, data as depicted in FIG. 30 is presented to the user. In the example of FIG. 30, the judgment results of the step S7 to S13 are presented for each of the product number field and product name field. Incidentally, as for the event name, "denial" is indicated for all fields, because it is judged that there is no time stamp and the product number DB is excluded from the tables to be analyzed in the following processing. According to this example, it is understood that the probability that the time stamp field exists is very low, and the probabilities that the respective fields correspond to the event ID or associated ID are equivalent.

Returning to the explanation of FIG. 3, when the step S15 is completed, the user conducts modification inputs or determination inputs for the event name, time stamp, the event ID and associated ID candidates and the like, conducts or instructs copy of records and the like, creates event candidate data, and stores the event candidate data into the event candidate data storage 5 (step S16). Because this work is mainly or partially conducted by the user, the step S16 is indicated by a dotted line block in FIG. 3. Then, the processing returns to the step S3.

For example, according to the judgment results of FIG. 21, when the table name "order" is finally determined as the event name, the time field is finally determined as the time stamp, the order number field and the area field are finally determined as the event ID and associated ID candidates, data as depicted in FIG. 32 is stored into the event candidate data storage 5, for example. In the example of FIG. 32, the event name "order" is added to all of the records, the field values in the time field for all records are copied to the time stamp field, and the field names and field values in the order number field and area field for all records are copied as the event ID and associated ID candidates.

For example, according to the judgment results of FIG. 22, when the table name "order" is finally determined as the event name, the time field is finally determined as the time stamp, and the order number field, area field and order contents field are finally determined as the event ID and associated ID candidates, data as depicted in FIG. 33 is stored into the event candidate data storage 5, for example.

Furthermore, for example, according to the judgment results of FIG. 23, when the table name "production" is finally determined as the event name, the time field is finally determined as the time stamp, and the production number field and order number field are finally determined as the event ID and associated ID candidates, data as depicted in FIG. 34 is stored into the event candidate data storage 5, for example.

In addition, for example, according to the judgment results of FIG. 24, when the table name "production" is finally determined as the event name, the time field is finally determined as the time stamp, and the production number field and order number field are finally determined as the event ID and associated ID candidates, data as depicted in FIG. 35 is stored into the event candidate data storage 5, for example.

Furthermore, for example, according to the judgment results of FIG. 25, when the table name "arrangement" is finally determined as the event name, the time field is finally determined as the time stamp, and the arrangement number field and order number field are finally determined as the event ID and associated ID candidates, data as depicted in FIG. 36 is stored into the event candidate data storage 5, for example.

In addition, for example, according to the judgment results of FIG. 26, when the table name "arrangement" is finally determined as the event name, the time field is finally determined as the time stamp, and the arrangement number field, order number field, product number field and delivery destination field are finally determined as the event ID and associated ID candidates, data as depicted in FIG. 37 is stored into the event candidate data storage 5, for example.

Moreover, for example, according to the judgment results of FIG. 27, when the table name "delivery" is finally determined as the event name, the time field is finally determined as the time stamp, and the arrangement number field, delivery service field and delivery destination field are finally determined as the event ID and associated ID candidates, data as depicted in FIG. 38 is stored into the event candidate data storage 5, for example.

In addition, for example, according to the judgment results of FIG. 28, when the table name "delivery" is finally determined as the event name, the time field is finally determined as the time stamp, and the arrangement number field, delivery service field and delivery destination field are finally determined as the event ID and associated ID candidates, data as depicted in FIG. 39 is stored into the event candidate data storage 5, for example.

In addition, when the table in which plural time stamp fields exist in one table as depicted, for example, in FIG. 19, is processed, data as depicted, for example, in FIGS. 40 to 44 is stored in the event candidate data storage 5. In the examples of FIGS. 40 to 44, based on the slip issuance time field, approval time field, order time field, delivery time filed and inspection time field, which are finally determined as the time stamp, the event candidate data in which the respective event names are finally determined as "slip issuance", "approval", "order", "delivery" and "inspection" is generated for each of those fields. As for the time stamp, the field values of the slip issuance time field, approval time field, order time field, delivery time field and inspection time field for all records are copied to the respective time stamp fields of the event candidate data. Furthermore, as for the fields other than the slip issuance time field, approval time field, order time field, delivery time field and inspection time field, the field names and field values for all records are respectively copied as the event ID and associated ID candidates to the event candidate data for each of those fields.

Thus, the event candidate data to be used in the following processing is stored into the event candidate storage 5. The aforementioned matters are main portions in this embodiment. Incidentally, the following matters are post-processing. The post-processing may be conducted by a human being, manually.

When it is judged at the step S3 that all of the analysis target tables have been processed, the event data generator 7 carries out an event data generation processing by using the event candidate data stored in the event candidate data storage 5, and stores the processing result into the event data storage 9 (step S17).

Figure 45:
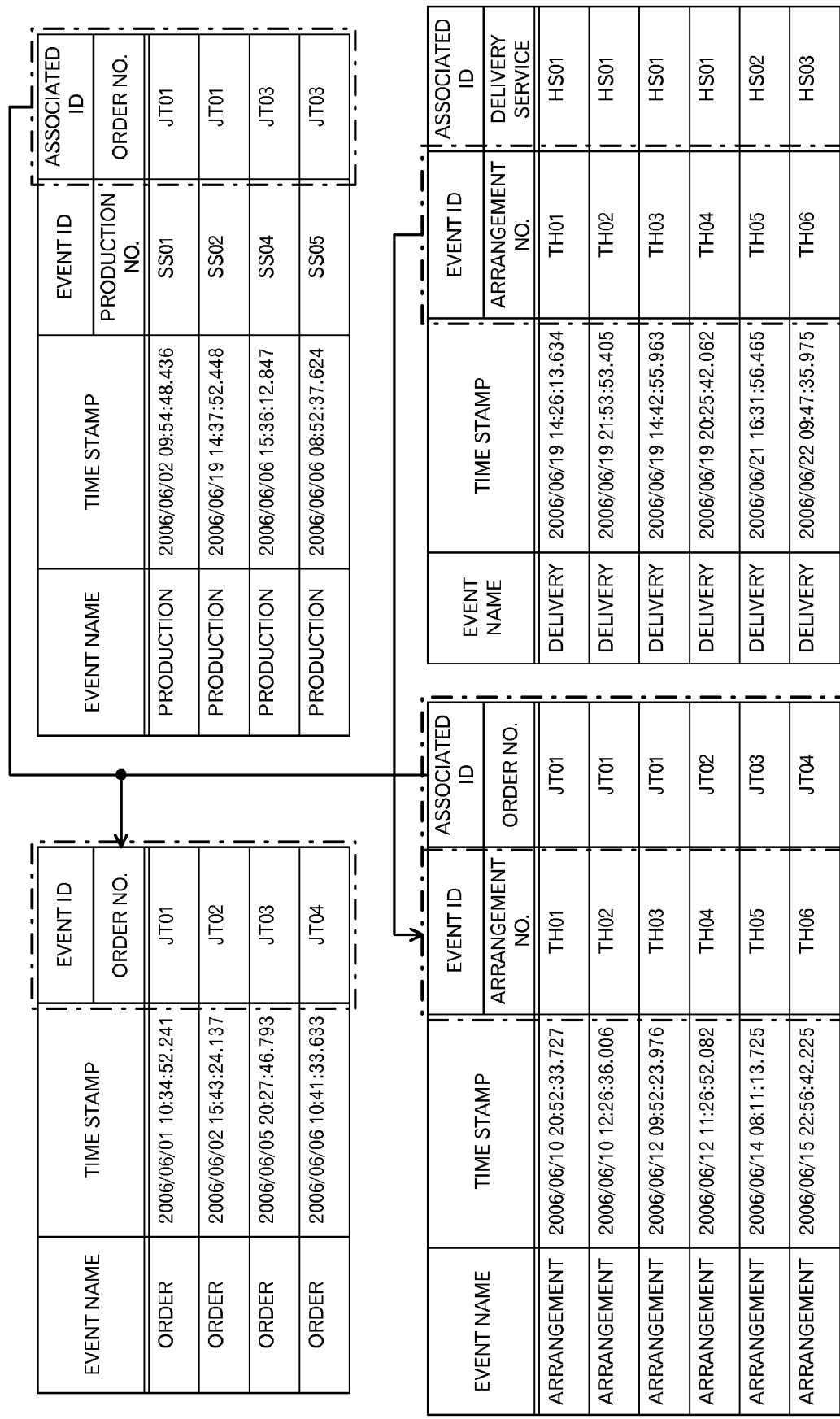
FIG. 45 is a diagram depicting an example of the event data and inter-event relational tree.

An example of the event data is depicted in FIG. 45, which is generated by using one set of the event candidate data depicted in FIGS. 32, 34, 36 and 38 or one set of the event candidate data as depicted in FIGS. 33, 35, 37 and 39, respectively in association with the order event, production event, arrangement event and delivery event. As for the generation method of the event data, an automatic extraction method of the association information of the event data, which is described in the aforementioned Japanese Patent Application 2006-197294 may be used, or the association between the events may be finally determined by manually investigating and analyzing the correspondence relation of the field values of the event ID and associated ID candidates for the respective event candidate data.

In FIG. 45, it is finally determined that the event ID of the order event is the order number, the event ID of the production event is the production number, the associated ID is the order number, the event ID of the arrangement event is the arrangement number, the associated ID is the order number, and the event ID of the delivery event is the arrangement number, and the associated ID is the delivery service. In addition, the association between the events is finally determined, specifically, when it is identified that value of the field values of the event ID of the order event corresponds to a certain field value of the associated ID of the production event, a certain record (i.e. event instance) of the production event is associated with a specific record (i.e. event instance) of the order event. The similar associations between the association ID of the arrangement event and the event ID of the order event and between the event ID of the delivery event and the event ID of the arrangement event have been finally determined.

In addition, the process instance generator 13 carries out a process instance generation processing by using the event data stored in the event data storage 19, and stores the processing results into the process instance data storage 15 (step S19). A business process tracking method described in U.S. Patent Application Publication 2005/076059A1 or the like can be used as the generation method. Incidentally, this publication is incorporated into this application.

Figure 46A:
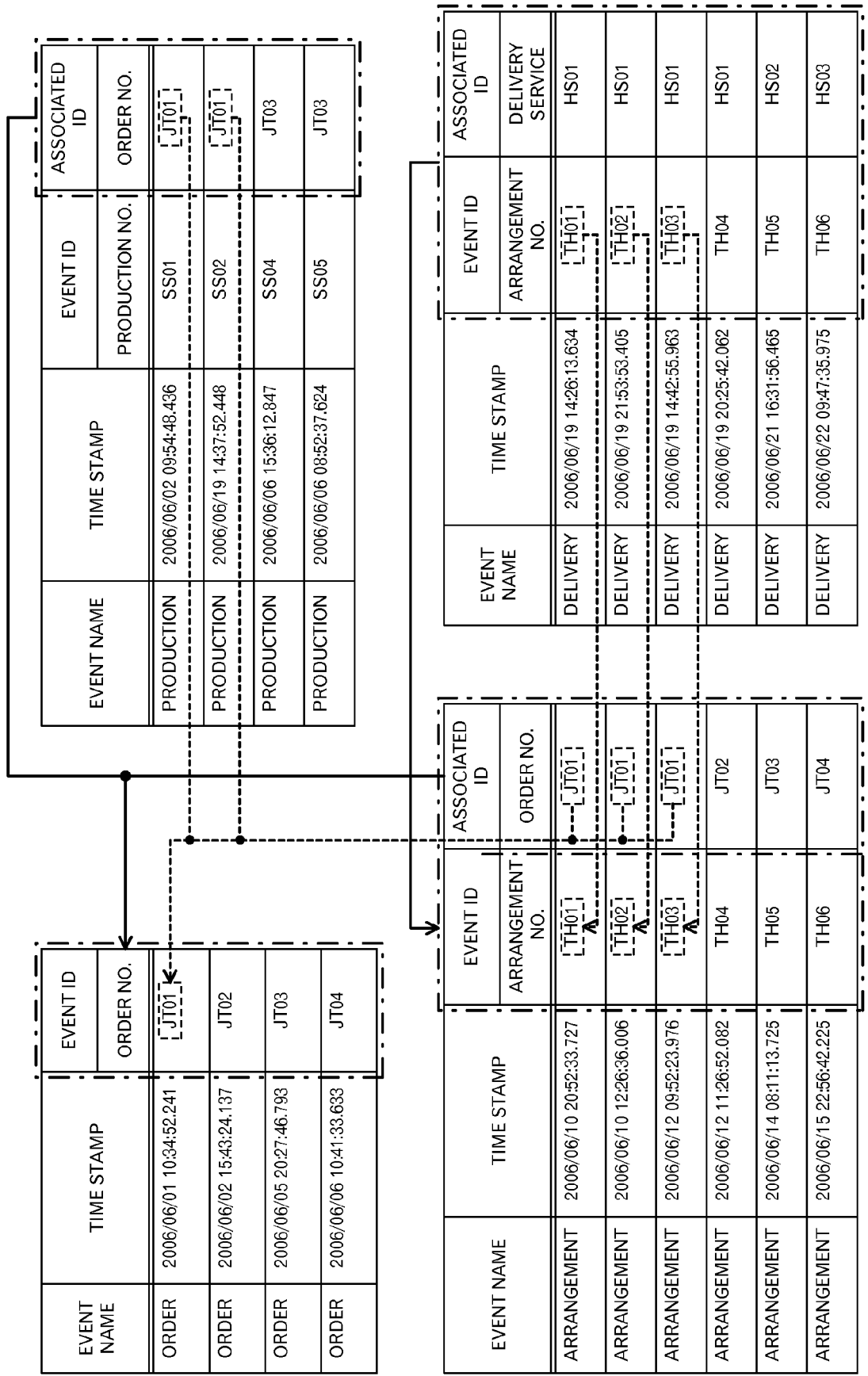
FIGS. 46A and 46B are diagrams to explain process instance generation from the event data.
Figure 46B:
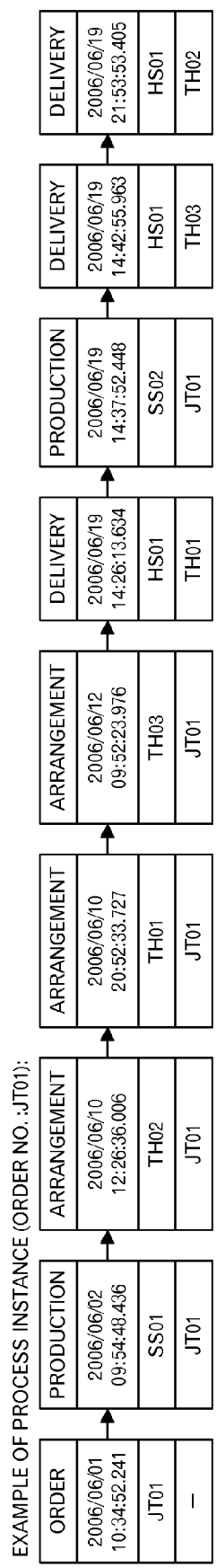

By using the event data of FIG. 45, outline explanation of a processing process to generate a process instance whose starting point is the order event instance of the order number: JT01 is depicted in FIGS. 46A and 46B. First, as the records (i.e. event instance) whose field value of the associated ID is the field value: JT01 of the order number, which is the event ID of the order event, two event instances from the production event and three event instances from the arrangement event are determined. Next, as the records (i.e. event instance) whose field value of the associated ID is the arrangement number: TH01, TH02 or TH03, which was determined as the event ID of the arrangement event, three event instances from the delivery event are determined. Finally, by connecting the event instances having direct or indirect association from the determined order event instance of the order number: JT01 as the starting point in an order of the time progress based on the time stamp values, the process instance is generated.

Figure 47:
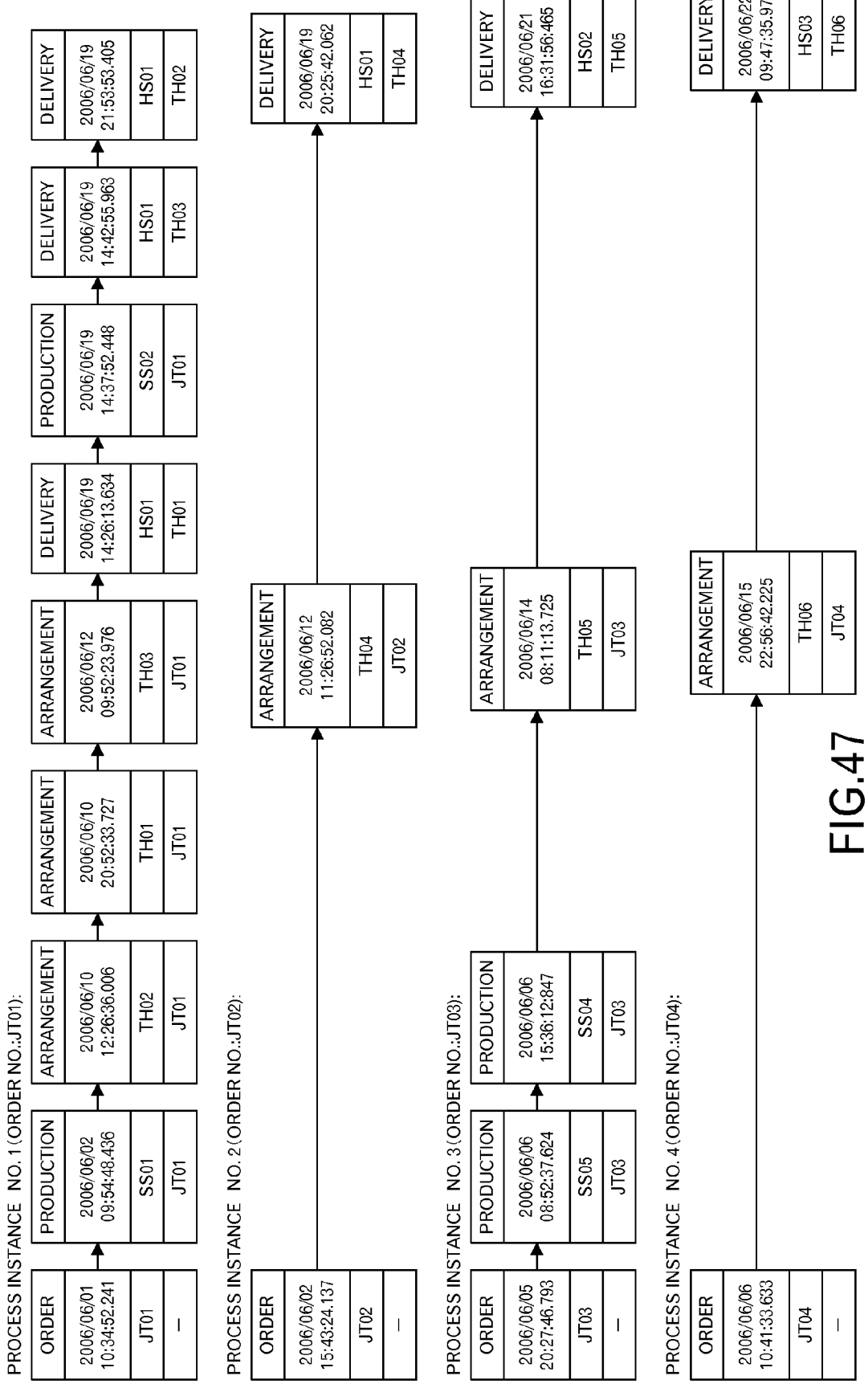
FIG. 47 is a diagram depicting an example of process instances.

Similarly, by using the event data in FIG. 45, all of the generated process instances are depicted in FIG. 47.

Furthermore, the process flow generator 17 carries out a process flow generation processing by using data stored in the process instance data storage 15, and stores the processing result into the process flow data storage 19 (step S21). A processing method of the business mode generation program described in the aforementioned Japanese Patent Application 2006-136518 or the like can be used for the generation method.

Figure 48:
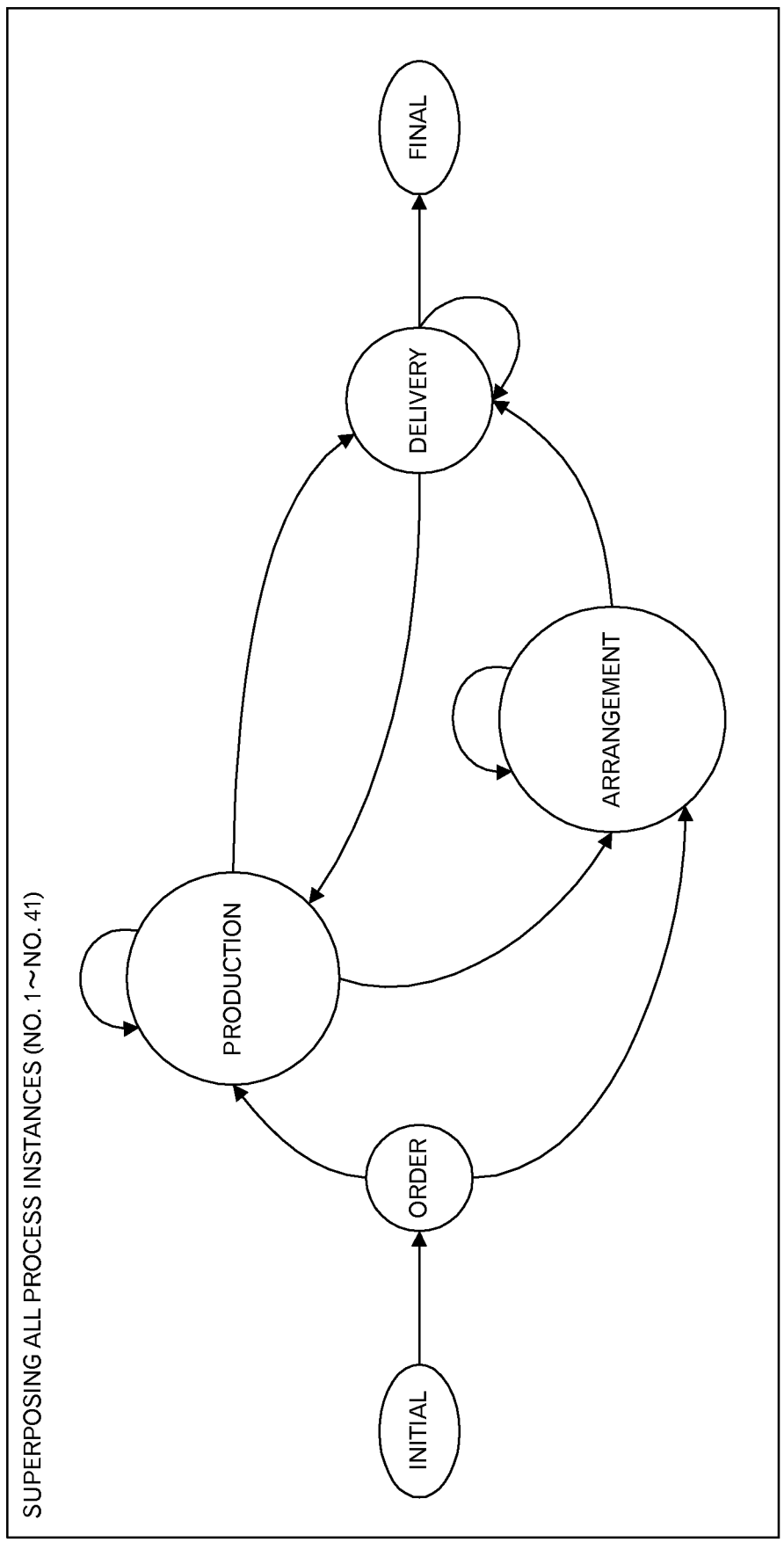
FIG. 48 is a diagram depicting a display example of process flow analysis results.

A process flow, which is generated by superposing all process instances in FIG. 47, is depicted in FIG. 48. A circle in figure indicates an event class (i.e. a kind of event), and an arrow indicates a transition between events, which occur during the business process.

Finally, the process analyzer 21 carries out a process analysis processing by using data stored in the process flow data storage 19, and stores the processing results into the analysis result storage 23 (step S23). An analysis method of the business model generation program described in the aforementioned Japanese Patent Application 2006-136518 or the like can be used for the analysis method.

Figure 49:
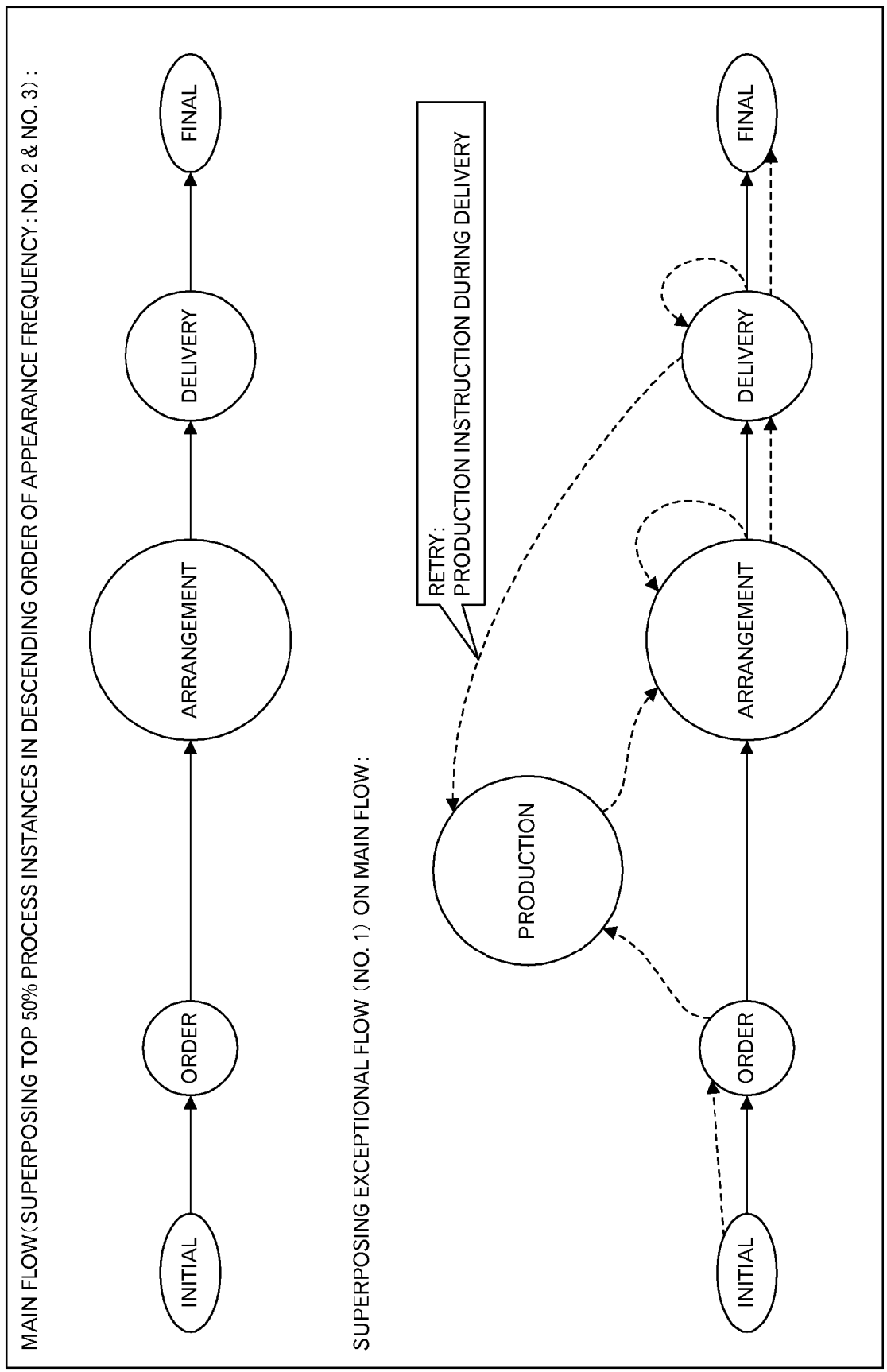
FIG. 49 is a diagram depicting another display example of the process flow analysis results.

An example that the analysis of the business process has been carried out based on the all process instances in FIG. 47 is depicted in FIG. 49. By superposing the top 50% process instances in a descending order of the appearance frequency, namely superposing the second and third process instances in FIG. 47, it is possible to carry out display for the analysis of the main flow of the analysis target business process. In addition, by further superposing, the first process instance as an exception flow in FIG. 47 onto the main flow display, it is possible to carry out display to discover the transition between events, which is out of the assumption. From the display of FIG. 49, it is possible to discover the transition between the events, which makes it suspicious that a retry from the delivery event to the production event occurs.

After carrying out the aforementioned processing, the input and output unit 11 presents the user with the processing results of the respective processors (step S25).

By carrying out such a processing, the user can conduct the analysis of the business process only by copying the data of the business systems without modifying the business systems. In addition, the data of the business systems may be RDB or CSV. The other formats can be handled based on the aforementioned technical ideas.

In addition, in the processing flow of FIG. 3, it is possible to exchange the order of the steps S7 and S13 or execute them in parallel.

In addition, in the output of the judgment results, the fields whose judgment result indicates "determined" and whose confidence score is equal to or greater than a predetermined threshold may be automatically selected in each judgment item to present the user with the selected fields, and the user may be prompted to carry out selection or input for the judgment items which could not be selected, automatically.

Furthermore, processing loops for the processing target fields are constituted in each of the steps S7 to S13, but the processing loops for the processing target fields may be put out of the steps S7 to S13.

Figure 50:
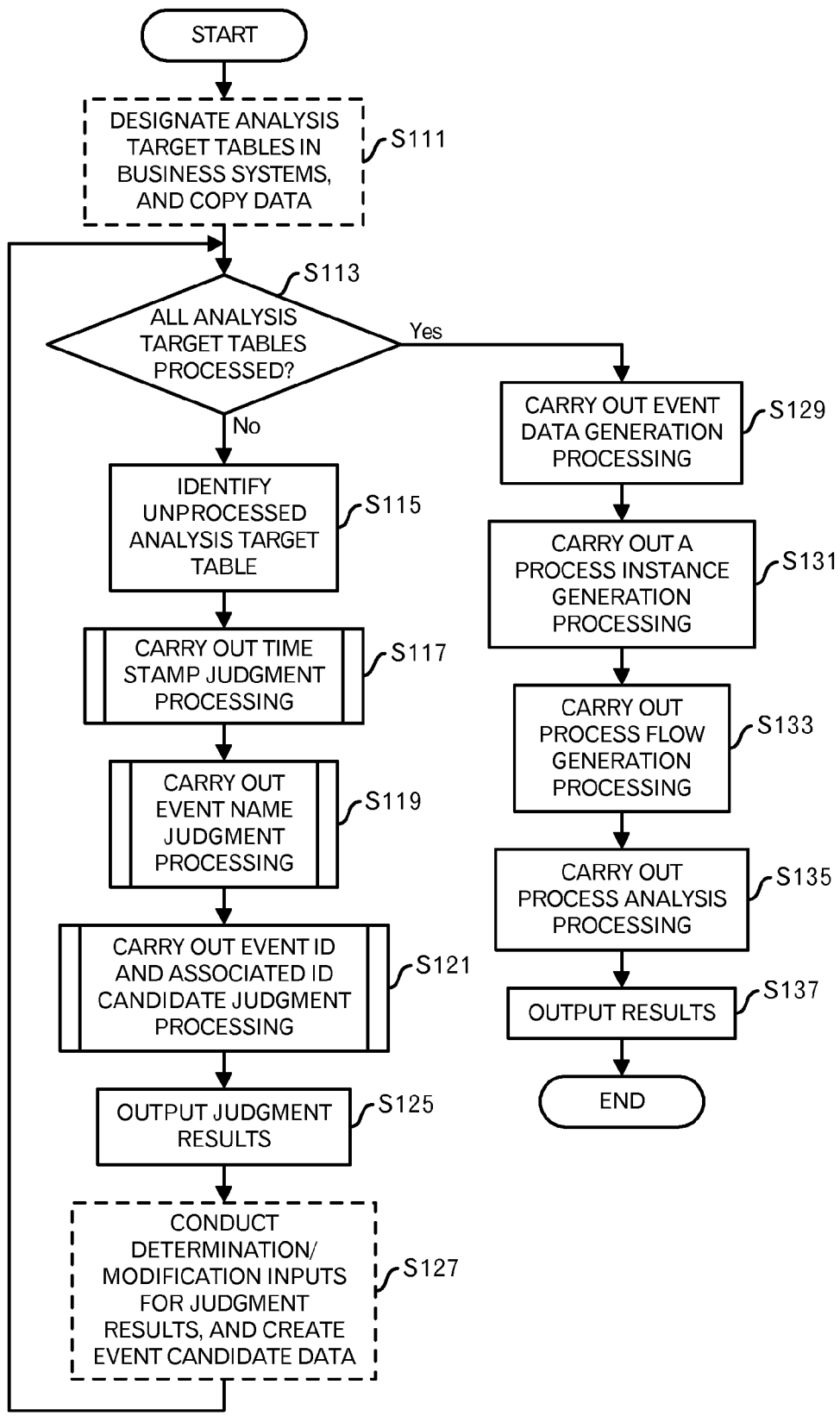
FIG. 50 is a diagram depicting another example of the main processing flow in the embodiment of this invention.

A modification example of FIG. 3 is depicted in FIG. 50. First, the user designates analysis target tables in the business systems, and stores the copied data into the analysis target data storage 1 (FIG. 50: step S111). Because this is a user operation, this step is depicted by a dotted line box in FIG. 50. Next, for example, the event candidate data generator 3 judges whether or not all of the analysis target tables have been processed (step S113).

When an unprocessed analysis target table exists, for example, the event candidate data generator 3 identifies an unprocessed analysis target table (step S115). Then, the time stamp processor 31 carries out the time stamp judgment processing (step S117). This processing is the same as the processing of FIG. 14. Furthermore, the event name processor 34 carries out the event name judgment processing (step S119). This processing is also the same as the processing flow of FIG. 18. Thus, in this embodiment, the timing of the event name judgment processing is advanced.

After that, the event ID and associated ID candidate processor 32 carries out the event ID and associated ID candidate judgment processing (step S121). This processing is also the same as the processing flow of FIG. 16.

Then, the event candidate data generator 3 presents the user with the judgment results of the steps S117 to S121 through the input and output unit 11 (step S125). The contents to be presented are the same as the aforementioned examples. After the end of the step S125, the user conducts modification inputs or determination inputs for the event name, time stamp, event ID and associated ID candidates and the like through the input and output unit 11, conducts or instructs copy of records to create the event candidate data, and instructs the event candidate data generator 3 to store the event candidate data into the event candidate data storage 4 (step S127). This work is mainly or partially carried out by the user. Therefore, this step is depicted by the dotted line box in FIG. 50. Then, the processing returns to the step S113.

When it is judged at the step S113 that all of the analysis target tables have been processed, the event data generator 7 carries out the event data generation processing by using the event candidate data stored in the event candidate data storage 5, and stores the processing results into the event data storage 9 (step S129).

In addition, the process instance generator 13 carries out a process instance generation processing by using the event data stored in the event data storage 9, and stores the processing results into the process instance data storage 15 (step S131).

Furthermore, the process flow generator 17 carries out the process flow generation processing by data stored in the process flow data storage 19 (step S133).

Finally, the process analysis unit 21 carries out the process analysis processing by using the data stored in the process flow data storage 19 (step S135).

After carrying out the aforementioned processing, the input and output unit 11 presents the user with the processing results of the respective processors (step S137).

By carrying out such a processing, the user can conduct analysis of the business process only by collecting data recorded for the operation management and data processing results for the original business, without modifying the business systems. In addition, data of the business system may be RDB or CSV. Even the other format can be treated based on the aforementioned ideas.

In addition, in the output of the judgment results, the fields whose judgment result indicates "determined" and whose confidence score is equal to or greater than a predetermined threshold may be automatically selected for each judgment item to present the user with the selected fields, and the user may be prompted to carry out selection or input for the judgment items which could not be selected, automatically.

Furthermore, processing loops for the processing target fields are constituted in the step S121, but the processing loops for the processing target fields may be put out of the steps S121.

Furthermore, in case of FIG. 3 and also in case of FIG. 50, without automatically generating the event data from the event candidate data (namely, without carrying out the step S17 or S129), the user may conduct consideration based on the outputs of, for example, the step S15 or S125 to create the event data not through the event candidate data, at the step S16 or S127. Namely, the user may designate the associations between IDs by using his or her own skills, and store such data into the event data storage 9.

Although one embodiment of this invention was explained above, this invention is not limited to this embodiment. For example, the functional block diagram depicted in FIG. 1 is a mere example, and the diagram does not always correspond to actual program modules. In addition, the respective score tables are mere examples, and a method for setting the confidence score values may be determined more specifically, based on the experiences. Furthermore, as for the items of the score table, the number of items may be lesser or greater.

Figures 43, 44, 51:
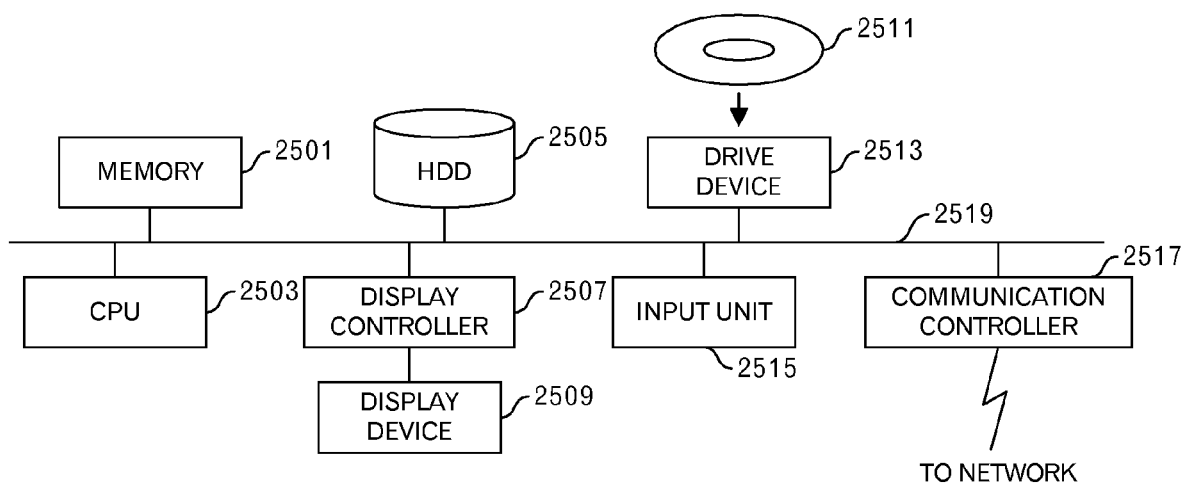
FIG. 43 is a diagram depicting an example of the event candidate data concerning delivery of FIG. 19.
FIG. 44 is a diagram depicting an example of the event candidate data concerning inspection of FIG. 19.
FIG. 51 is a functional block diagram of a computer.

Incidentally, the business system analysis apparatus is a computer device as shown in FIG. 51. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 51. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the computer-readable removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in detail are realized.

What is claimed is:

1. A computer-implemented information processing method for a business process analysis, comprising:
    first identifying a processing target field in a record generated in an analysis target system and stored in a data storage;
    second identifying data representing probability that said processing target field corresponds to a time stamp of an event by using definition data for each field in said record, wherein said definition data is stored in said data storage; and
    presenting a user with the identified data so as to correspond to each said field.

2. The computer-implemented information processing method as set forth in claim 1, wherein said definition data is schema information of a database, and
    said second identifying comprises:
    identifying a data type of said processing target field; and
    judging whether or not said data type of said processing target field corresponds to a data type representing said time stamp.

3. The computer-implemented information processing method as set forth in claim 1, wherein said definition data comprises a field name, and
    said second identifying comprises identifying data representing probability that said processing target field corresponds to a time stamp of an event, based on a character string contained in said field name of said processing target field.

4. The computer-implemented information processing method as set forth in claim 1, wherein said second identifying comprises identifying data representing probability that said processing target field corresponds to a time stamp of an event, based on a field value of said processing target field.

5. The computer-implemented information processing method as set forth in claim 1, wherein a rule is defined that lower probability is assigned in an order of a character string representing a time, a character string representing a date and a character string representing a future time, and said second identifying comprises checking whether or not said character string representing said time, said character string representing said date or said character string representing said future time is included in a field name of said processing target field.

6. The computer-implemented information processing method as set forth in claim 1, wherein said second identifying comprises:
    identifying pertinent data of said processing target field, based on said definition data and field values stored in said data storage; and
    identifying data representing probability, which corresponds to the identified pertinent data of said processing target field, by referring to a data structure including predefined characteristics of a field name or a field value and corresponding data representing probability.

7. A computer-implemented information processing method for a business process analysis, comprising:
    identifying a processing target field in a record generated by an analysis target system and stored in a data storage;
    identifying a characteristic of a field value of said processing target field, wherein said field value is stored in said data storage;
    identifying data representing probability that said processing target field corresponds to an event ID of an event, based on whether or not said characteristic of said field value of said processing target field has a predetermined characteristic and
    upon detecting that said data representing probability is not data representing denial, identifying second data representing probability that said processing target field corresponds to an event of an event ID, by using definition data for each field in a record, wherein said definition data is stored in said data storage.

8. The computer-implemented information processing method as set forth in claim 7, wherein said definition data includes data of a data type of each said field.

9. The computer-implemented information processing method as set forth in claim 7, wherein said definition data includes key setting data.

10. The computer-implemented information processing method as set forth in claim 7, wherein said identifying said second data representing probability comprises:
    identifying pertinent data of said processing target field, based on said definition data; and
    identifying second data representing probability, which corresponds to said pertinent data of said processing target field, by referring to a data structure including a predefined data type of said field or a predefined characteristic of said field and corresponding data representing probability.

11. The computer-implemented information processing method as set forth in claim 7, further comprising: presenting a user with said data representing probability that said processing target field corresponds to said event ID of said event and said second data representing probability that said processing target field is said event ID of said event, so as to correspond to each said field.

12. The computer-implemented information processing method as set forth in claim 7, wherein said identifying said data representing probability comprises:

judging whether or not said field values of said processing target field are unique in all of said records; and judging whether or not said field values of said processing target field include NULL.

13. A computer-implemented information processing method for a business process analysis, comprising:

identifying a processing target field in a record generated by an analysis target system and stored in a data storage device;

identifying a characteristic of a field value of said processing target field, wherein said field value is stored in said data storage;

identifying data representing probability that said processing target field corresponds to an associated ID of an event, based on whether or not said characteristic of said field value of said processing target field has a predetermined characteristic; and upon detecting that said data representing probability is not data representing denial, identifying second data representing probability that said processing target field corresponds to said associated ID of said event, by using definition data for each field in said record, wherein said definition data is stored in said data storage.

14. The computer-implemented information processing method as set forth in claim 13, wherein said definition data includes data of a data type of each said field.

15. The computer-implemented information processing method as set forth in claim 13, wherein said definition data includes key setting data.

16. The computer-implemented information processing method as set forth in claim 13, wherein said identifying said second data representing probability comprises:

identifying pertinent data of said processing target field, based on said definition data; and identifying second data representing probability, which corresponds to the identified pertinent data of said processing target field, by referring a data structure including a predefined data type or a predefined characteristic of said field and corresponding data representing probability.

17. The computer-implemented information processing method as set forth in claim 13, further comprising:

presenting a user with said data presenting probability that said processing target field is said associated ID of said event and said second data representing probability that said processing target field corresponds to said associated ID of said event, so as to correspond to each said field.

18. The computer-implemented information processing method as set forth in claim 13, wherein said identifying representing probability comprises judging whether or not said field values of said processing target field include two or more values except NULL.

19. A computer-implemented information processing method for a business process analysis, comprising:

first identifying, for each field in a record generated in an analysis target system and stored in a data storage, data representing probability that said field corresponds to a time stamp of an event, by using definition data for each said field in said record, wherein said definition data is stored in said data storage;

second identifying a field designated as said time stamp by a user based said data representing probability that said field corresponds to said time stamp of said event or a field whose data representing probability that said field corresponds to said time stamp of said event is predetermined data; and third identifying an event name based on the number of identified fields, and wherein said third identifying comprises identifying a table name as said event name, when said number of identified fields is single.

20. A computer-implemented information processing method for a business process analysis, comprising:

first identifying, for each field in a record generated in an analysis target system and stored in a data storage, data representing probability that said field corresponds to a time stamp of an event, by using definition data for each said field in said record, wherein said definition data is stored in said data storage;

second identifying a field designated as said time stamp by a user based said data representing probability that said field corresponds to said time stamp of said event or a field whose data representing probability that said field corresponds to said time stamp of said event is predetermined data; and third identifying an event name based on the number of identified fields, and wherein said third identifying comprises identifying said event name based on field names of the identified fields, when said number of identified fields is plural.

21. The computer-implemented information processing method as set forth in claim 20, further comprising:

identifying a characteristic of a field value of each said field, wherein said field value is stored in said data storage device;

identifying data representing probability that said field corresponds to an event ID of an event, based on whether or not said characteristic of said field value of each said field has a predetermined characteristic; and upon detecting that said data representing probability that said field corresponds to said event ID of said event is not data representing denial, identifying second data representing probability that said field is said event ID of said event, by using said definition data for each said filed in said record.

22. The computer-implemented information processing method as set forth in claim 21, further comprising:

identifying data representing probability that said field corresponds to an associated ID of said event, based on whether or not said characteristic of said field value of said field has a predetermined second characteristic; and upon detecting that said data representing probability that said field corresponds to said associated ID of said event is not data representing denial, identifying second data representing probability that said field corresponds to said associated ID of said field, by using said definition data.

* * * * *